(12) United States Patent
Bobba et al.

(10) Patent No.: US 7,198,195 B2
(45) Date of Patent: *Apr. 3, 2007

(54) MULTIPLE PLANE SCANNING SYSTEM FOR DATA READING APPLICATIONS

(75) Inventors: Mohan LeeLaRama Bobba, Eugene, OR (US); Jorge Louis Acosta, Eugene, OR (US); Timothy Joseph Eusterman, The Woodlands, TX (US); James W. Ring, Blodgett, OR (US); Alexander M. McQueen, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/341,071

(22) Filed: Jan. 27, 2006

(65) Prior Publication Data

US 2006/0124745 A1 Jun. 15, 2006

Related U.S. Application Data

(60) Continuation of application No. 10/858,909, filed on Jun. 1, 2004, now Pat. No. 6,991,169, which is a continuation of application No. 10/431,070, filed on May 6, 2003, now Pat. No. 6,974,084, which is a continuation of application No. 09/078,196, filed on May 13, 1998, now Pat. No. 6,568,598, which is a division of application No. 08/806,194, filed on Feb. 26, 1997, now Pat. No. 5,837,988, which is a division of application No. 08/554,819, filed on Nov. 7, 1995, now Pat. No. 5,705,802, which is a division of application No. 08/155,112, filed on Nov. 19, 1993, now Pat. No. 5,475,207, which is a continuation-in-part of application No. 07/913,580, filed on Jul. 14, 1992, now abandoned.

(51) Int. Cl.
*G06K 7/10* (2006.01)

(52) U.S. Cl. ............................ 235/462.38; 235/462.37; 235/462.32

(58) Field of Classification Search . 235/462.32–462.4
See application file for complete search history.

(56) References Cited

U.S. PATENT DOCUMENTS

| 3,958,104 A | 5/1976 | Zuckerman ............... 235/61.11 |
| 4,587,407 A | 5/1986 | Ahmed et al. ............... 235/467 |
| 4,652,732 A | 3/1987 | Nickl .......................... 235/462 |

(Continued)

FOREIGN PATENT DOCUMENTS

BE 899019 6/1984

(Continued)

OTHER PUBLICATIONS

H. Ikeda et al., "Bar-Code Reading Technology," *Bulletin of the Precision Engineering Society*, vol. 54, No. 12, pp. 28-32 (1988).

(Continued)

*Primary Examiner*—Karl D. Frech
(74) *Attorney, Agent, or Firm*—Stoel Rives LLP

(57) ABSTRACT

An optical system and method for data reading. A preferred system is directed to a scanner which includes a laser diode and a beam splitter for generating first optical beam and a second optical beam, the first optical beam being directed toward one side of a scanning optical element such as a rotating polygon mirror and to a first mirror array, the second optical beam being simultaneously directed toward a second optical element such as another side of the rotating polygon mirror and then to a second and a third mirror array. The first mirror array is configured to generate a scan pattern through a vertical window and the second and third mirror arrays are configured to generate scan patterns passing through a horizontal window. In combination, the three mirror arrays generate three sets of scan lines so as to scan five sides of a six-sided item (e.g., the bottom and all lateral sides of an object) being passed through the scan volume.

9 Claims, 17 Drawing Sheets

U.S. PATENT DOCUMENTS

| | | | |
|---|---|---|---|
| 4,799,164 A | 1/1989 | Hellekson et al. | 235/467 |
| 4,839,507 A | 6/1989 | May | 235/381 |
| 4,848,862 A | 7/1989 | Yamazaki et al. | 350/3.71 |
| 4,851,667 A | 7/1989 | Mergenthaler | 250/236 |
| 4,861,973 A | 8/1989 | Hellekson et al. | 235/467 |
| 4,867,257 A | 9/1989 | Kuchler | 177/25.15 |
| 4,939,355 A | 7/1990 | Rando et al. | 235/467 |
| 5,025,477 A | 6/1991 | Baitz et al. | 382/8 |
| 5,042,619 A | 8/1991 | Kohno | 186/61 |
| 5,073,702 A | 12/1991 | Schuhmacher | 235/467 |
| 5,081,364 A | 1/1992 | Wike, Jr. | 250/555 |
| 5,128,520 A | 7/1992 | Rando et al. | 235/375 |
| 5,206,491 A | 4/1993 | Katoh et al. | 235/467 |
| 5,229,588 A | 7/1993 | Detwiler et al. | 235/467 |
| 5,256,864 A | 10/1993 | Rando et al. | 235/462 |
| 5,266,788 A | 11/1993 | Yamazaki et al. | 235/467 |
| 5,268,565 A | 12/1993 | Katoh et al. | 235/467 |
| 5,293,033 A | 3/1994 | Yamashita | 235/462 |
| 5,361,158 A | 11/1994 | Tang | 359/204 |
| 5,410,108 A | 4/1995 | Williams et al. | 177/25.15 |
| 5,459,308 A | 10/1995 | Detwiler et al. | 235/467 |
| RE35,117 E | 12/1995 | Rando et al. | 235/375 |
| 5,491,328 A | 2/1996 | Rando | 235/462 |
| 5,495,097 A | 2/1996 | Katz et al. | 235/462 |
| 5,504,316 A | 4/1996 | Bridgelall et al. | 235/462 |
| 5,629,511 A | 5/1997 | Iwaguchi et al. | 235/462 |
| 5,684,289 A | 11/1997 | Detwiler et al. | 235/467 |
| 5,693,930 A | 12/1997 | Katoh et al. | 235/467 |
| 5,705,802 A * | 1/1998 | Bobba et al. | 235/462.39 |
| 5,723,852 A | 3/1998 | Rando et al. | 235/467 |
| 5,869,827 A | 2/1999 | Rando | 235/462.4 |
| 5,886,336 A | 3/1999 | Tang et al. | 235/462 |
| 6,045,046 A | 4/2000 | Detwiler | 235/467 |
| 6,059,189 A | 5/2000 | Detwiler et al. | 235/467 |
| RE37,166 E | 5/2001 | Rando et al. | 235/462.36 |
| 6,536,668 B1 | 3/2003 | Detwiler et al. | 235/462.37 |
| 2003/0102377 A1 | 6/2003 | Good | 235/462.32 |

FOREIGN PATENT DOCUMENTS

| | | |
|---|---|---|
| EP | 044958 | 9/1991 |
| EP | 0664504 | 3/1995 |
| FR | 2367320 | 5/1978 |
| GB | 1445100 | 8/1976 |
| JP | 63-109590 | 5/1988 |
| JP | 63-146198 | 6/1988 |
| JP | 63-178376 | 7/1988 |
| JP | 63-189981 | 8/1988 |
| JP | 63-192175 | 8/1988 |
| JP | 1-142072 | 9/1989 |
| JP | 1-144953 | 10/1989 |
| JP | 2-85983 | 3/1990 |
| JP | H-2-83681 | 3/1990 |
| JP | H-2-83686 | 3/1990 |
| JP | 2-231688 | 9/1990 |
| JP | 3-103995 | 4/1991 |
| JP | 3-129583 | 6/1991 |
| JP | 3-167683 | 7/1991 |
| JP | 3-253811 | 11/1991 |
| JP | 3-257691 | 11/1991 |
| JP | 3-257692 | 11/1991 |
| JP | 3-265079 | 11/1991 |
| JP | 3-266195 | 11/1991 |
| JP | 5-6484 | 1/1993 |
| NL | 7713-933 | 6/1979 |
| WO | WO 90/01715 | 2/1990 |

OTHER PUBLICATIONS

T. Inagaki et al., "Applying Holograms to Pattern Input/Output Technology," *Fujitsu*, vol. 38, No. 2, pp. 137-142 (1987).

N. Nishida, "Optical System of the POS Scanner," *Machine Design*, vol. 29, No. 8, pp. 69-73 (1985) with translation of Fig. 9.

Excerpts from Interference No. 104,631 between the parent (Pat. No. 6,568,598) of the present application and U.S. Pat. No. 5,684,289.

Prosecution History of Detwiler et al. U.S. Pat. No. 6,536,668, U.S. Appl. No. 09/507,321, filed Feb. 28, 2000 "Dual Aperture Optical Scanner".

Detwiler et al. U.S. Appl. No. 09/815,882, filed Mar. 23, 2001 which is a reissue of Pat. No. 5,684,289 (portions of prosecution history as of Aug. 2003).

Rando et al. U.S. (reissue) Appl. No. 09/745,302, filed Dec. 20, 2000 (continuation of RE 37,166 and Reissue of US 5,128,520.

Complaint for Patent Infringement and Declaratory Judgment, *NCR Corporation v. PSC, Inc. and PSC Scanning, Inc.*, Case No. 3:04cv0142 (S.D. Ohio, Dayton), filed Apr. 30, 2004.

Civil Docket, *NCR Corporation v. PSC, Inc. and PSC Scanning, Inc.*, Case No. 3:04cv0142 (S.D. Ohio (Dayton)), printed Jul. 8, 2004.

Complaint for Patent Infringement, *PSC Scanning, Inc. v. NCR Corporation*, Civil Action No. 04-6137-AA (D. Oregon, Eugene), filed May 5, 2004.

Civil Docket, *PSC Scanning, Inc. v. NCR Corporation*, Civil Action No. 04-6137-AA (D. Oregon (Eugene)), printed Jul. 8, 2004.

Claim chart of invalidity of U.S. Patent No. 6,568,598 asserted by NCR Corp. in Oct. 2004 for settlement conference relating to the pending cases *NCR Corporation V. PSC, Inc. and PSC Scanning, Inc.*, Case No. 3:04cv0142 (S.D. Ohio, Dayton) *PSC Scanning, Inc. v. NCR Corporation*, Civil Action No. 04-6137-AA (D. Oregon, Eugene). Document Submitted Under MPEP § 724.

Excerpts of Presentation slides of assertions relating to Patent No. 6,568,598 made by NCR Corp. Oct. 2004 for settlement conference relating to the pending cases *NCR Corporation v. PSC, Inc. and PSC Scanning, Inc.*, Case No. 3:04cv0142 (S.D. Ohio, Dayton) *PSC Scanning, Inc. v. NCR Corporation*, Civil Action No. 04-6137-AA (D. Oregon, Eugene). Document Submitted Under MPEP § 724.

Claim charts asserted by PSC Scanning, Inc. for Oct. 2004 for settlement conference relating to the pending cases *NCR Corporation v. PSC, Inc. and PSC Scanning, Inc.*, Case No. 3:04cv0142 (S.D. Ohio, Dayton) *PSC Scanning, Inc. v. NCR Corporation*, Civil Action No. 04-6137-AA (D. Oregon, Eugene). Document Submitted Under MPEP § 724.

NCR Model 7870 Scanner/Scale User Guide Rev. C (1992, 1993).

Web page: "NCR History of Innovation" downloaded from http://www.ncr.co.jp/library/library/scanniversary/barscan/scanner3.html (1998) visited Nov. 8, 2004.

Eleven photographs of NCR 7870 scanner and its checkerside scan patterns, taken Oct.-Nov. 2004 (manufacture label bearing a date of 1996).

Brochure of the Spectra-Physics Magellan® Scanner Scale (1996).

Claim chart relating to Claim 53 of U.S. 6,568,598 (Jan.-Feb. 2005). Document Submitted Under MPEP § 724.

Complaint for Patent Infringement, *PSC Scanning, Inc. v. Metrologic Instruments, Inc.*, Civil Action No. 06-6102-TC (D. Oregon, Eugene) filed May 10, 2006.

*PSC Scanning, Inc. v. Metrologic Instruments, Inc.*, Civil Action No. 06-6102-TC (D. Oregon (Eugene)), printed Sep. 1, 2006.

* cited by examiner

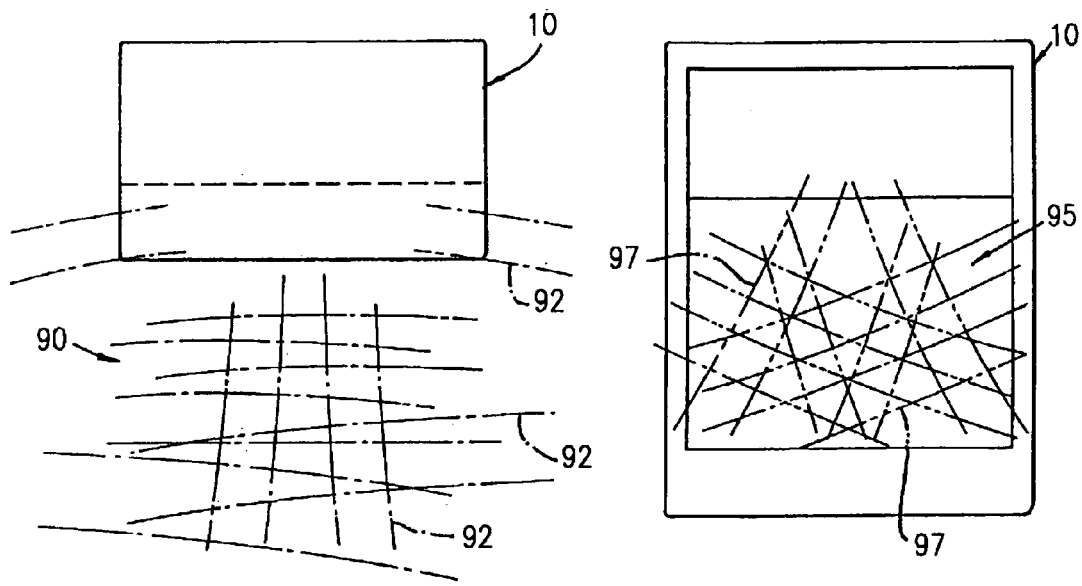
*fig. 5.*          *fig. 6.*
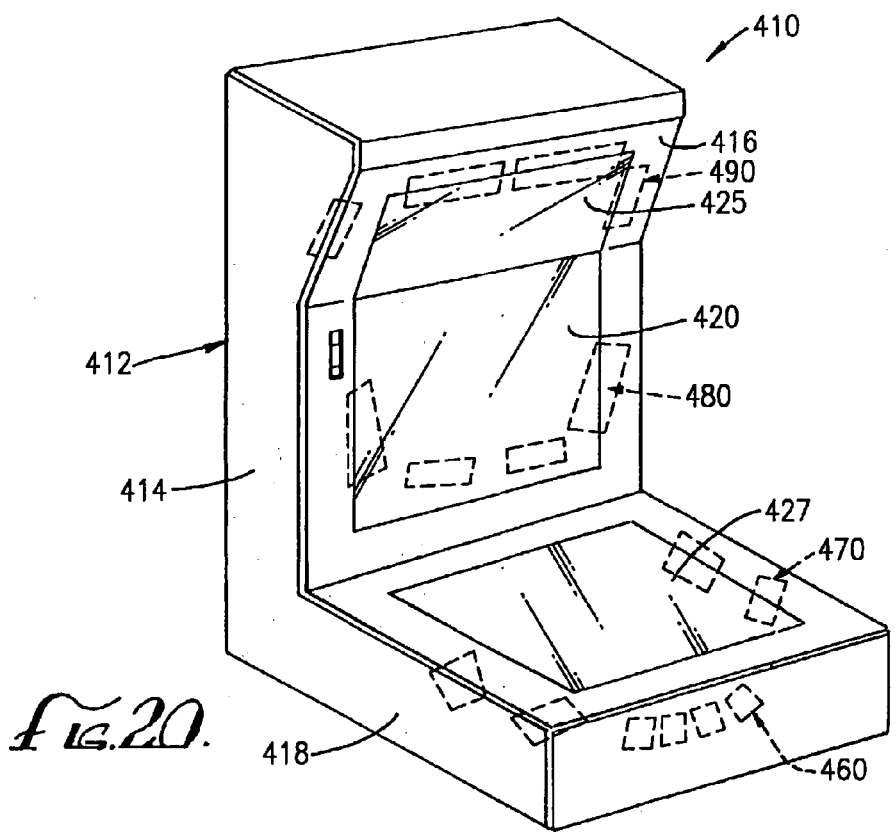
*fig. 20.*

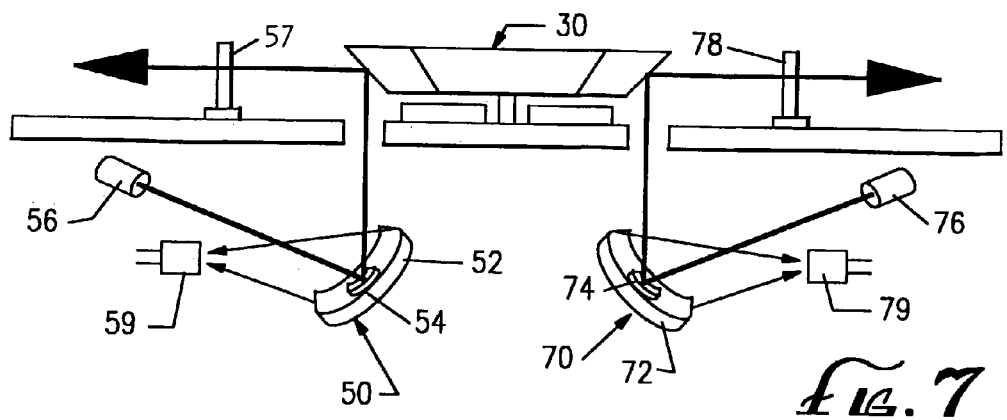
*fig. 7*
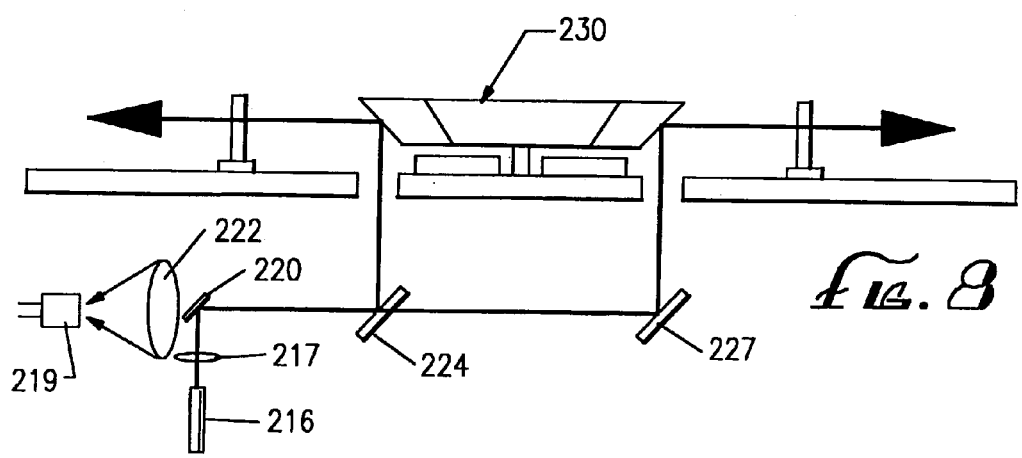
*fig. 8*
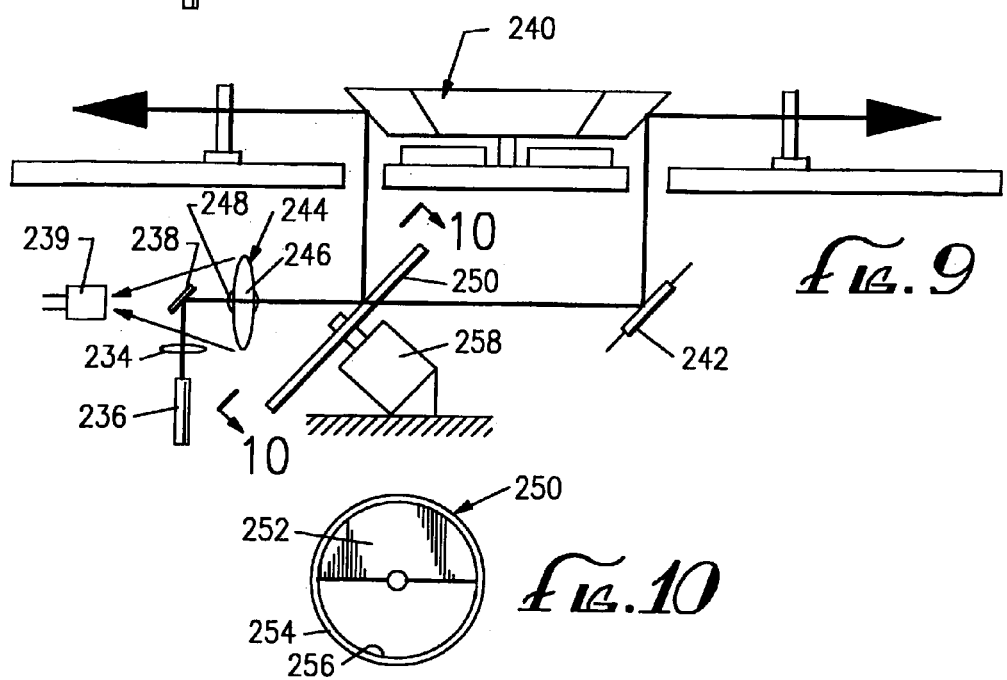
*fig. 9*
*fig. 10*

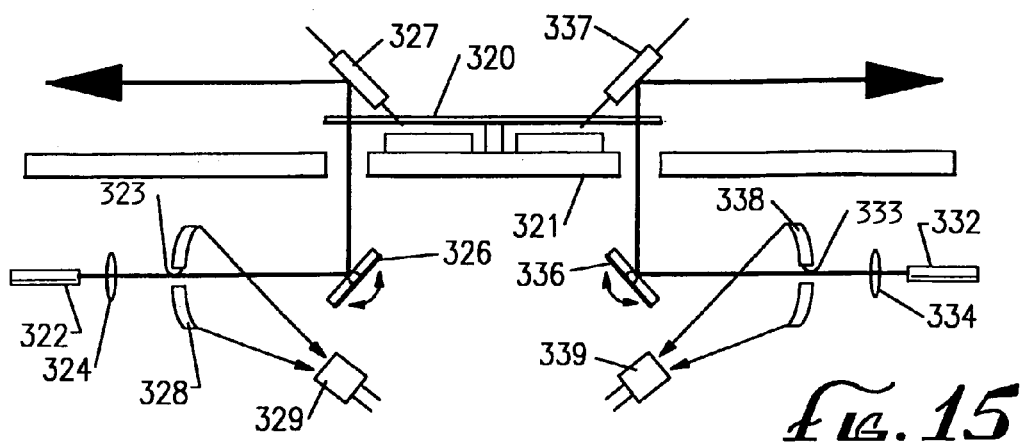
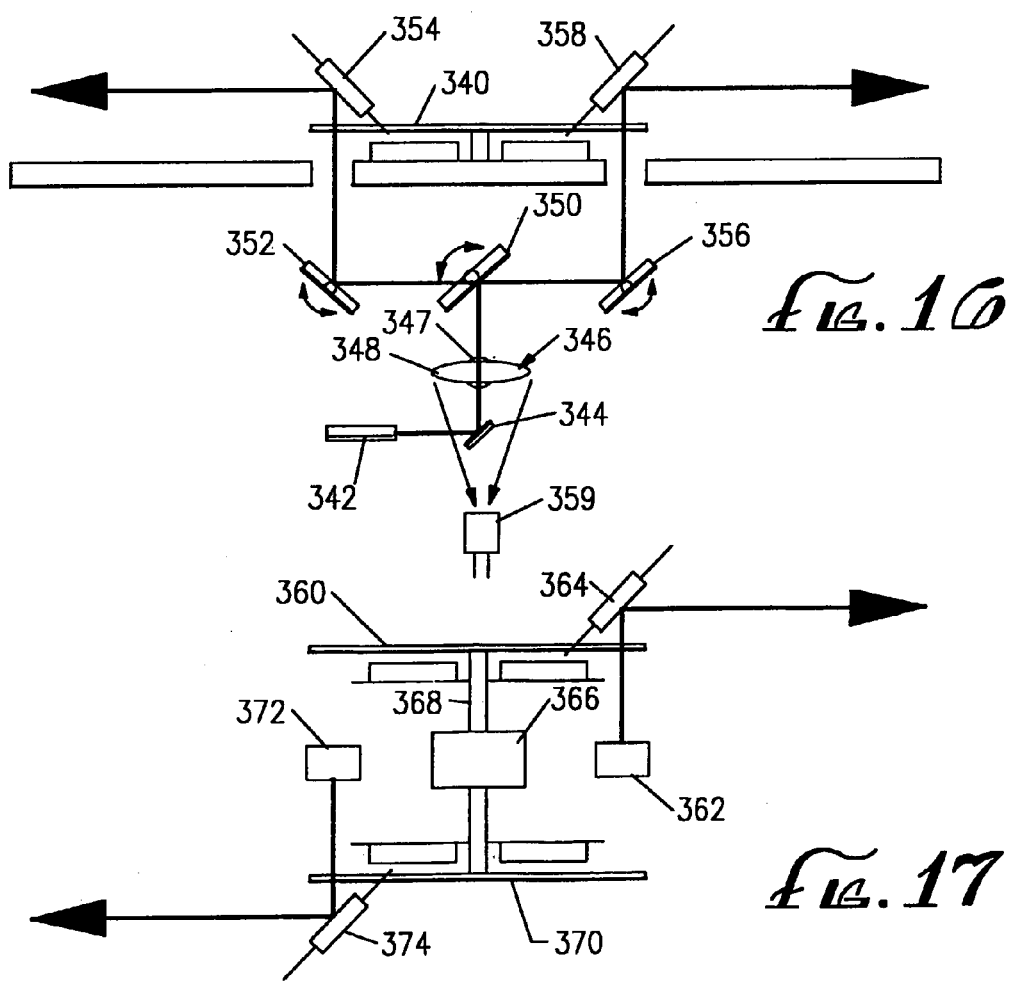

MULTIPLE PLANE SCANNING SYSTEM FOR DATA READING APPLICATIONS

RELATED APPLICATION DATA

This application is a continuation of application Ser. No. 10/858,909 filed Jun. 1, 2004, now U.S. Pat. No. 6,991,169, which is a continuation of application Ser. No. 10/431,070, filed May 6, 2003, now U.S. Pat. No. 6,974,084, which is a continuation of application Ser. No. 09/078,196, filed May 13, 1998, now U.S. Pat. No. 6,568,598, which is a divisional of application Ser. No. 08/806,194, filed Feb. 26, 1997, now U.S. Pat. No. 5,837,988, which is a divisional of application Ser. No. 08/554,819, filed Nov. 7, 1995, now U.S. Pat. No. 5,705,802, which is a divisional of application Ser. No. 08/155,112, filed Nov. 19, 1993, now U.S. Pat. No. 5,475,207, which is a continuation-in-part of application Ser. No. 07/913,580, filed Jul. 14, 1992, now abandoned.

BACKGROUND

The field of the present invention relates to optical scanning systems and particularly to a scanning system capable of successfully reading objects aligned in a variety of orientations. Certain embodiments are especially suitable for use as a fixed scanner such as that employed at a supermarket checkout counter reading bar codes such as those found on consumer products.

For effective and accurate performance, a bar code scanner depends upon focused optics and scanning geometry. Fixed scanners frequently employ a rotating polygon mirror which directs a scanning beam toward a mirror array for generating a desired scan pattern. One type of fixed bar code scanner positions a scan engine in a base with a scan window oriented in a horizontal plane. One such scanning system is disclosed in U.S. Pat. No. 5,073,702, in which a scanning beam is reflected off a mirror array which has a plurality of mirrors arranged in a generally semicircular pattern. The scanning beam reflecting off each of the mirrors has a vertically upward component thereby passing through the window/aperture. Objects to be scanned are passed over the window with the bar codes oriented in a generally downward direction.

In another scanner orientation, the scan engine is housed in a vertical tower with the scan window oriented in a vertical plane. In such a vertical scanner, generally all the outgoing scan beams come out sidewards also having an upward vertical component. Objects to be scanned are passed in front of the window with the bar codes oriented in a generally sideward direction.

In order to produce a successful scan, an object must be oriented with its bar code passed in front of the scan window at an angle which is not so oblique as to prevent a scan line from striking or "seeing" the bar code. Therefore, to achieve a successful scan, the user must position the object with the bar code placed sufficiently close to the desired orientation. The range of suitable plane orientation of the object bearing the bar code is limited by the size of the window and the angle over which the mirror array can direct a scan pattern. Present vertical scanners can scan bar codes oriented on certain lateral sides (i.e., side facing) which face the vertical window, but experience difficulties in scanning faces oriented in a horizontal plane (i.e., facing up or down) or lateral sides opposite the window. Horizontal scanners (i.e., upward facing) are fairly adept at scanning the bottom side but are frequently limited as to which lateral sides may be scanned. The present inventors have recognized that it would be desirable to increase the range of plane orientation readable by a scanning system which would minimize required bar code label orientation, support belt to belt (automatic) scanning, and otherwise provide for improved scanning ergonomics.

SUMMARY

The present invention relates to optical systems and methods for data reading. A first preferred system is directed to a scanner which includes a housing with an upper housing section and a lower housing section whereby multiple groups of scanning beams are directed out from these lower and upper housing sections to project a plurality of scan lines onto each of at least five sides of an item being passed through a scan volume. Various configurations are disclosed for producing the groups of scanning beams including single and multiple laser beams produced by one or more laser diodes, one or more rotating polygon mirrors or holographic disks. In a preferred configuration, the scanner includes a light source generating a light beam and a beam splitter dividing the light beam into a first optical beam and a second optical beam, but other multiple beam generation embodiments are disclosed. In a preferred embodiment, return signals detected from both first and second optical beams are processed by a single microprocessor to allow for unified signal processing.

Additional aspects and advantages of this invention will be apparent from the following detailed description of preferred embodiments, which proceeds with reference to the accompanying drawings.

BRIEF DESCRIPTION OF THE DRAWINGS

FIG. 5 is a diagrammatic top plan view of the scan pattern along a horizontal plane generated from the upper mirror array of the scanner of FIG. 1;

FIG. 6 is a diagrammatic front side elevation view of the scan pattern along a vertical plane generated from the lower mirror array of the scanner of FIG. 1;

FIG. 7 is a schematic diagram illustrating a preferred polygon mirror scanning and collecting configuration;

FIG. 8 is a schematic diagram illustrating an alternate polygon mirror light scanning and collecting configuration;

FIG. 9 is a schematic diagram illustrating another alternate polygon mirror scanning and collecting configuration;

FIG. 10 is a detailed view of the shutter of FIG. 9 taken along line 10—10;

FIG. 15 is a schematic diagram illustrating a holographic disk light scanning and collecting configuration;

FIG. 16 is a schematic diagram illustrating an alternate holographic disk light scanning and collecting configuration;

FIG. 17 is a schematic diagram illustrating a dual holographic disk light scanning and collecting configuration;

FIG. 20 is a front perspective view of a combination vertical and horizontal scanner;

DETAILED DESCRIPTION OF PREFERRED EMBODIMENTS

Figure 1:
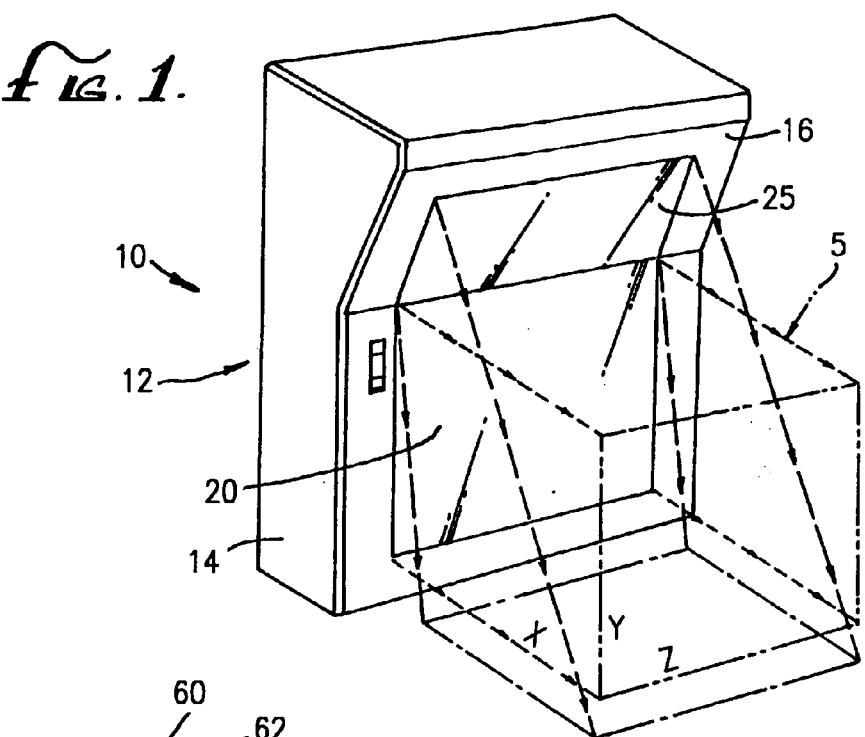
FIG. 1 is a front perspective view of a vertical multiplane scanner according to the present invention.

The preferred embodiments will now be described with reference to the drawings. FIG. 1 is a schematic diagram of a preferred vertical scanner 10 having a housing 12 with a lower housing portion 14 and an upper housing portion 16.

The scanner 10 generates a scan volume generally designated by element numeral 5 with scanning beams projected outwardly through lower and upper windows 20 and 25. In order to facilitate referral to relative directions, orthogonal coordinates (X, Y, Z) are designated in FIG. 1. The X coordinate is defined as a sideways direction, perpendicular to or horizontally outward from the lower window 20 of the scanner housing 12; the Y coordinate is defined as a vertically upward direction; and the Z coordinate is defined as another horizontal direction parallel to the lower window 20.

Figure 2:
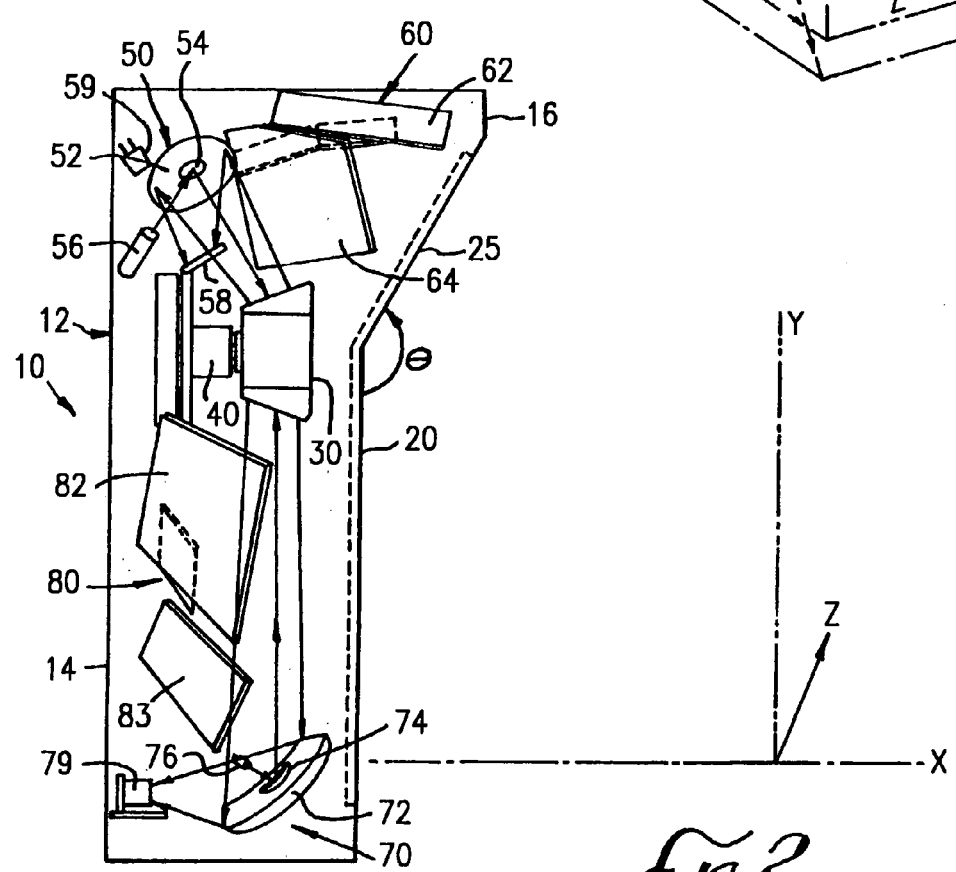
FIG. 2 is a partially diagrammatic right side elevation view of the scanner of FIG. 1.
Figure 3:
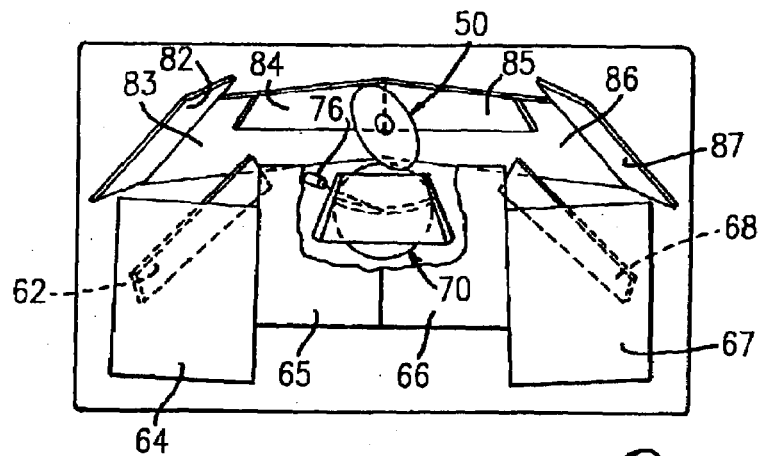
FIG. 3 is a partially diagrammatic top plan view of the scanner of FIG. 1.
Figure 4:
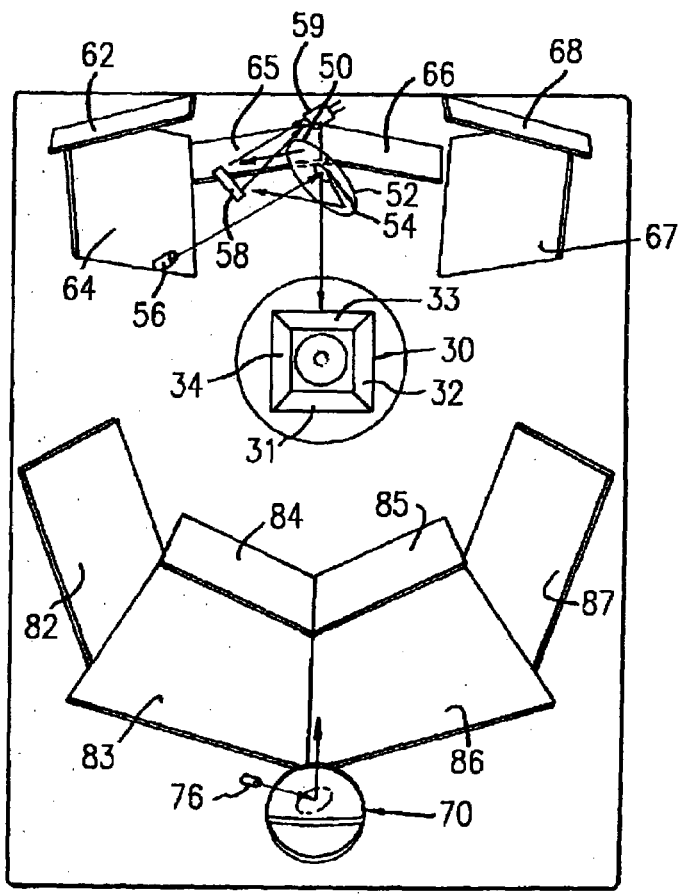
FIG. 4 is a partially diagrammatic front side elevation view of the scanner of FIG. 1.

FIGS. 2–4 illustrate the internal scanning beam generation and collection configuration of the scanner 10. The scanner 10 has two windows namely a lower window 20 and an upper window 25 arranged at an oblique or inclined angle to one another. The scanner 10 may alternately have a single vertical or inclined window, but the dual window configuration provides physical information to the user regarding the direction of the scanning beams, namely that one scanning beam pattern is generally emanating from the upper window 25 and one scanning beam pattern is generally emanating from the lower window 20.

The scan engine of scanner 10 has a central rotating polygon mirror 30 driven by a motor 40. In the lower housing portion 14, a light source 76 generates a beam of light and directs it toward mirror 74. The light source 76 may be a laser, laser diode, or any other suitable source. The mirror 74 focuses and reflects light toward the polygon mirror 30 which has four mirror facets 31, 32, 33, 34. As the polygon mirror 30 rotates, the outgoing beam is directed across the lower mirror array 80 and then reflected out through the lower window 20 to achieve a desired scan pattern. Light reflecting off the target returns via the same path and is collected by a collection mirror 72 and focused onto a detector 79. The polygon mirror 30 is preferably molded in a single piece out of plastic, but could be constructed out of acrylic or other optical materials including other plastics, metals or glass by one skilled in the art. The outer surface of each mirror facet may be advantageously coated with a suitable high reflective coating, the coating chosen would depend upon the optical material of the polygon mirror 30. For example, a plastic or acrylic facet may have a metallic coating such as aluminum or gold, while a metal or glass facet may be preferably coated with a single or multi-layered dielectric such as silicon dioxide ($SiO_2$) or titanium dioxide.

The outgoing beam mirror 74 and the incoming collection mirror 72 are also preferably an integral unit of one-piece construction forming a mirror unit 70. Both mirror elements are optically powered, the smaller outgoing mirror 74 being parabolic and the larger collection mirror 72 being ellipsoidal.

Simultaneously (or intermittently if desired) to the operation of the lower scan generation, an upper light source 56 generates a beam of light and directs it toward mirror 54. The light source 56 may be a laser, laser diode, or any other suitable source. The mirror 54 focuses and reflects light toward the polygon mirror 30. As the polygon mirror 30 rotates, the outgoing beam is directed across the upper mirror array 60 and then reflected out through the upper window 25 to achieve a desired scan pattern. Light scattered off the target returns along the same path and is collected by a collection mirror 52, reflecting off fold mirror 58 and being focused onto a detector 59. The outgoing beam mirror 54 and the incoming collection mirror 52 are preferably an integral unit of one-piece construction forming a mirror unit 50. Both mirror elements are optically powered, the smaller outgoing mirror 54 being parabolic and the larger collection mirror 52 being ellipsoidal.

Outgoing light beam from the upper source 56 reflects off one side of the polygon mirror 30 while simultaneously a light beam from the lower source 76 reflects off an opposite side of the polygon mirror 30. The upper mirror array 60 cooperates with the rotating polygon mirror 30 to generate the scan pattern 90 shown in FIG. 5. FIG. 5 is a diagrammatic top plan view of a scan pattern 90 of intersecting scan lines 92 as shown in a horizontal X-Z plane at the base of the scanner 10.

The lower mirror array 80 cooperates with the rotating polygon mirror 30 to generate the scan pattern 95 shown in FIG. 6. FIG. 6 is a diagrammatic front elevation view of a scan pattern 95 of intersecting scan lines 97 as shown in a vertical Y-Z plane located at a distance of 6.0 in. (15.24 cm) from the scanner 10. From the above description and the scan patterns disclosed, one skilled in the art may construct a suitable polygon mirror 30 and mirror arrays 60, 80 to achieve the desired scan patterns.

As shown in FIGS. 2–4, the mirror arrays 60, 80 comprise a plurality of pattern mirrors arranged generally in what may be described as a semi-circular or oval pattern. The pattern mirrors may be configured to produce a multitude of desired scan patterns. The scanner 10 projects scanning sweeps along two generally orthogonal directions, one scanning sweep emanating generally downwardly and sidewardly from the upper inclined window 25 and one scanning sweep emanating generally sidewardly and upwardly from the vertical lower window 20. It is the cooperation of these two scanning sweeps emanating from different scanning directions which result in enhanced scanning range. The mirror arrays 60, 80 may be designed to produce a desired scan pattern for a particular application.

The upper window 25 is arranged at an oblique angle θ to the vertical lower window 20 of about 150°. The lower window 20 and upper window 25 are preferably constructed from glass, plastic or other suitable material. In an application where it is anticipated that objects may strike the window, it may be coated with a suitable scratch resistant coating or even constructed of sapphire. The lower and upper windows may constitute first and second window elements or may simply be apertures through which the scanning beams pass. The first window element is defined to be oriented in a first aperture plane and the second window element is defined to be oriented in a second aperture plane, the first aperture plane being oriented at an angle θ to the second aperture plane. Preferably the angle θ is greater than 90° and somewhat less than 180°, with a preferred angle of 150°.

Though in actuality the scan patterns generated by each mirror array 60, 80 are truly three dimensional, the scanning sweep generated by each of the mirror arrays may be generally described as a scan plane, the plane being defined by a median of scan lines emanating from the respective mirror array, positioning the plane in a coplanar orientation with the semicircle of the mirror array. By positioning the mirror arrays 60, 80 on opposite sides of the polygon mirror 30, the scan planes emanating from the mirror arrays intersect in the scan volume, the volume through which the objects to be scanned are passed. In an application of a vertically oriented scanner in a market checkout stand, the angle of the intersecting scan planes is preferably between about 30° and 90° with a preferred angle of about 60°.

Though the preferred scanning system is described as a fixed scanner with objects bearing a symbol such as a bar code being passed through the scan volume, alternately the scanner and the scan volume may be moved past a stationary object. Such a configuration may be desirable for inventory management or large object scanning applications for example. In either the fixed or moving scanner case, the object is being passed through the scan volume.

Alternately, the scanner window (if a single window is employed) or the scanner windows 20, 25 may comprise holographic elements to provide additional scan pattern directional control. As described above, FIGS. 2–4 illustrate a preferred beam generation and collection configuration. That configuration is also diagrammatically illustrated in FIG. 7. Light source 56 generates a beam of light onto a small aiming mirror 54 which focuses and reflects the light toward one side of the rotating polygon mirror 30 which scans the beam across the upper mirror array 60. Light returning from the target is collected by the collection mirror 52 and directed toward the detector 59. At the same time, the lower light generation and collecting system generates a light beam from light source 76 onto an aiming mirror 74 which focuses and reflects the light toward the opposite side of the rotating polygon mirror 30 which scans the beam across the lower mirror array 80. Light returning from the target is collected by the collection mirror 72 and directed toward the detector 79.

The configuration may also include additional components depending upon the application. For example, an optical element 57, 78 such as an aperture, filter or grating may be positioned in the respective light path to block out undesirable incoming light rays or provide some other desired function.

FIG. 7 illustrates only one preferred beam generation and collection configuration, but other configurations may be implemented. By way of example, certain alternate configurations are set forth in FIGS. 8–17 and will now be described.

FIG. 8 diagrammatically illustrates an alternate light generation and scanning configuration which employs a single light source 216. The light source 216 generates a beam of light through a focusing lens 217 which focuses the beam to reflect off a small fold mirror 220 which in turn directs the beam to a beam splitter 224. The beam splitter 224 has two functions (a) reflecting a portion of the light toward the polygon mirror 230 and (b) allowing a portion of the light to pass through to be directed by fold mirror 227 toward another side of the polygon mirror 230. On either side of the polygon mirror, the light beam is scanned across the respective mirror array generating the desired scan patterns. Light returning from the target reflects off the respective mirror array, the respective side of the polygon mirror 230, and then reflects off beam splitter 224 and mirror 227 and is collected by the collection lens 222 onto detector 219. In this embodiment having only a single detector 219, the system may require processing electronics for handling simultaneous signals. Alternately, the beam splitter 224 and the mirror 227 may be provided with a pivoting means or a shutter may be positioned in one or more of the light paths so that only one incoming beam is permitted at a given instant. Yet another design may comprise specific alignment of the beam splitter 224 and mirrors 227 and 230 so that only a single incoming signal is received by the detector 219 at a given instant. Yet another alternative design may include a separate detection system for the return beam associated with mirror 227.

Alternately, such a design may be configured with a rotating or pivoting fold mirror (for example in place of the beam splitter 224) which would alternately direct the light beam toward the fold mirror 227 or directly to the polygon mirror 230.

FIGS. 9–10 illustrate an alternate single light source configuration in which a light source 236 generates a beam of light which is focused by a focusing lens 234 (optional) and directed by a fold mirror 238 through a combination lens element 244 having a outgoing beam lenslet portion 248 and an incoming beam collection lens portion 246. The outgoing beam from the fold mirror 238 is focused by the lenslet 248 toward the shutter mirror 250. The shutter mirror 250 is a round shutter element rotated by a motor 258. The shutter mirror 250 has an outer support ring 254 with a portion of its circular surface comprising a reflecting mirror portion 252 and the remaining portion being a void 256.

When the mirror portion 252 is aligned in the beam path, the light beam is reflected toward the polygon mirror 240 and returning signal is reflected back to the collection lens which focuses the collected beam onto detector 239. When the void portion 256 is aligned in the beam path, the light beam passes therethrough and is then reflected off fold mirror 242 toward the polygon mirror 240 and returning signal is reflected back off the fold mirror 242, passing through the void portion 256 and on to the collection lens which focuses the collected beam onto detector 239. The relative size of the mirror portion 252 and the void portion 256 may be selected to adjust the relative amount that the upper and lower scanning is operated. In the preferred embodiment, a majority of the scanning beam would be directed to the upper scanning portion (e.g., 60%–70%) so the mirror portion 252 would be a larger arc (216°–252°) than the void portion (144°–108°).

Figure 11:
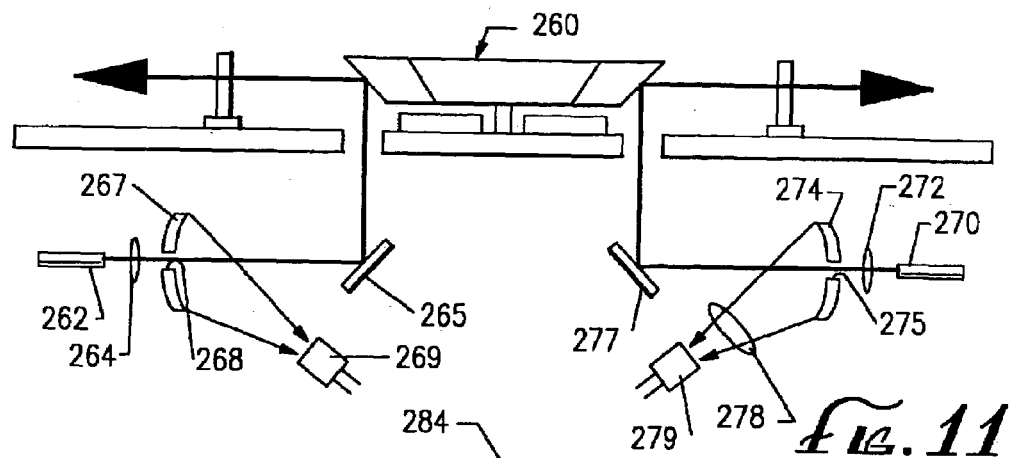
FIG. 11 is a schematic diagram illustrating another alternate polygon mirror scanning and collecting configuration.

FIG. 11 illustrates another alternative light scanning and collecting scheme. Separate light sources 262, 270 each generate a beam of light which is focused by a focusing lens 264, 272 and then passes through an aperture 268, 275 in a respective concave collecting mirror 267, 274. The light beam then is reflected off a respective fold mirror 265, 277 and then to either side of the polygon mirror 260. Beams are then scanned across respective mirror arrays and reflected signals return reflecting off the polygon mirror 260 facet, off respective fold mirror 265, 277 and then are collected by respective collection mirror 267, 274 to detector 269, 279. One side of the collection system also illustrates an additional focusing lens 278 in the light path between the collection mirror 274 and the detector 279 to assist in focusing the collected signal beam.

Though the previous embodiments illustrate a single polygon mirror for the optical scanning element or mechanism, other configurations may be employed such as for example a rotating optical polygon of any suitable number of facet mirrors, a rotating holographic disk, a pair of rotating single facet mirrors, or a pair of pivoting single facet mirrors, or any other suitable scanning mechanism. Some of these alternate designs will now be discussed.

Figure 12:
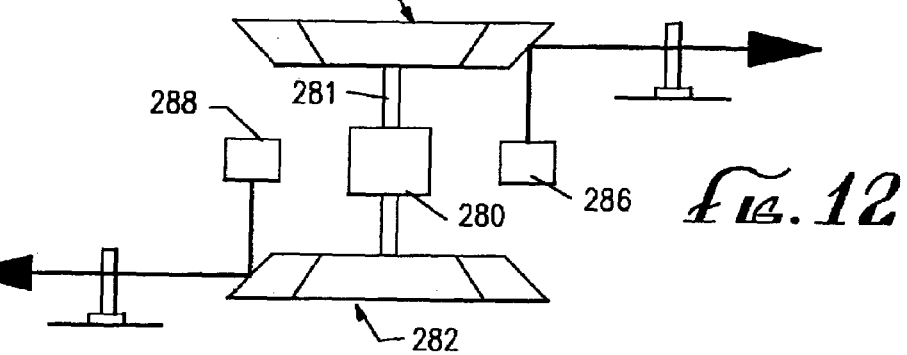
FIG. 12 is a schematic diagram illustrating another alternate polygon mirror scanning and collecting configuration.

FIG. 12 illustrates a scanning system having a first polygon mirror 284 and a second polygon mirror 282 driven by a common motor 280. The first and second polygon mirrors 284 and 282 may be mounted coaxially on a common shaft 281. The two light generation and detection schemes are schematically designated as elements 286, 288 and may comprise any suitable single or dual light source and any suitable light detector configuration such as those already described in the above embodiments.

Figure 13:
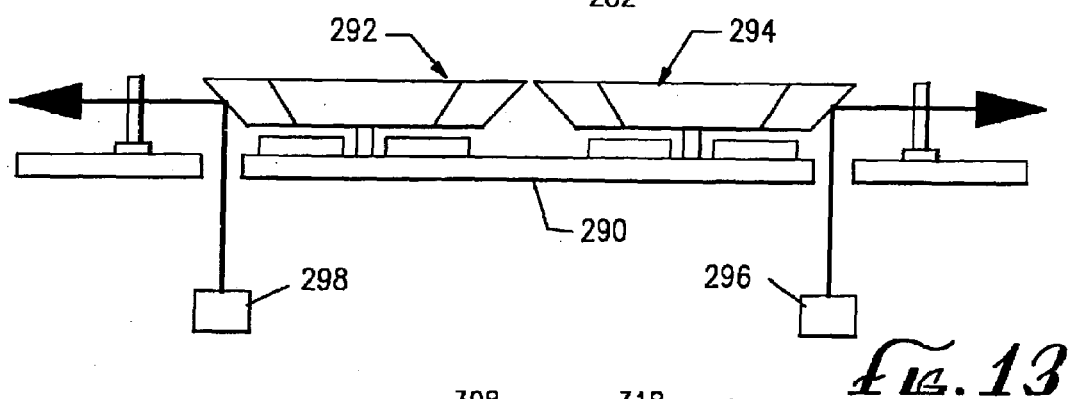
FIG. 13 is a schematic diagram illustrating another alternate polygon mirror scanning and collecting configuration.

Similarly, FIG. 13 illustrates a light scanning and collecting scheme having a first polygon mirror 292 and a second polygon mirror 294 arranged side-by-side. The polygon mirrors 292, 294 may be driven by a common motor through transmission means in the base 290. The two light generation and detection schemes are schematically designated as elements 296, 298 and may comprise any suitable single or dual light source and any suitable light detector configuration such as those already described in the above embodiments.

FIGS. 12 and 13 illustrate two polygon mirror arrangements, but other arrangements may be employed. For example, the polygon mirrors may be stacked one on top of the other driven on a common shaft. The mirrors in any of the multiple mirror configurations may be of different size and have different numbers of facets depending upon the particular application.

Figure 14:
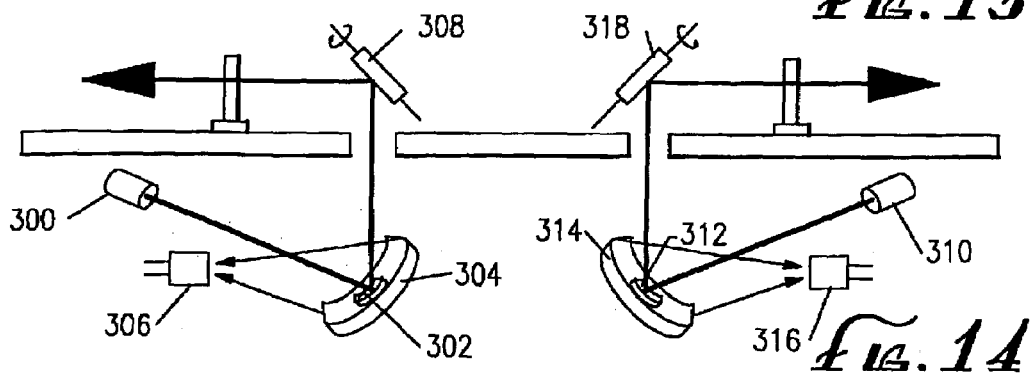
FIG. 14 is a schematic diagram illustrating an alternate light scanning and collecting configuration using an pair of movable mirrors.

FIG. 14 illustrates yet another alternative light scanning and collecting configuration. In this configuration, the optical scanning element comprises a pair of pivoting single facet mirrors 308, 318. Light source 300 generates a beam of light onto a small aiming mirror 302 which focuses and reflects the light toward pivoting mirror 308 which pivots to scan the beam across the first mirror array. Light returning from the target reflects off the first mirror array and then the pivoting mirror 308 and is collected by the collection mirror 304 and directed toward the detector 306. At the same time, the lower light generation and collecting system generates a light beam from light source 310 onto an aiming mirror 312 which focuses and reflects the light toward the pivoting mirror 318 which pivots to scan the beam across the second mirror array. Light returning from the target reflects off the second mirror array and then the pivoting mirror 318 is collected by the collection mirror 314 and is directed toward the detector 316.

FIG. 15 illustrates yet another alternative light scanning and collecting configuration. In this configuration, the optical scanning element comprises a rotating holographic disk 320 mounted on a motor and support frame 321. Separate light sources 322, 332 each generate a beam of light which is focused by a respective focusing lens 324, 334 and then passes through an aperture 323, 333 in a respective concave collecting mirror 328, 338. The light beam then is reflected off a respective pivoting fold mirror 326, 336 and then to either side of the rotating holographic disk 320. Beams are then scanned, reflecting off respective fold mirrors 327, 337, across respective mirror arrays toward the target. Return signals are directed through the holographic disk, off pivoting fold mirror 326, 336 and then are collected by respective collection mirror 328, 338 to detector 329, 339.

FIG. 16 illustrates an alternate light scanning and collecting configuration employing a single light source 342 which sends a beam of light toward a small fold mirror 344. Light reflecting off the fold mirror 344 passes through the inner lens portion 347 of lens 346 which focuses the outgoing beam toward pivoting or rotating fold mirror 350. Pivoting mirror 350 alternately directs light either toward pivoting fold mirror 352 or pivoting fold mirror 356 depending upon the orientation of the pivoting mirror 350. Light beams from the respective pivoting fold mirrors 352, 356 pass through the respective side of a rotating holographic disk 340. Beams passing through the holographic disk are then scanned, reflecting off respective fold mirrors 354, 358, across respective mirror arrays and reflected signals return being directed through the holographic disk, off pivoting fold mirror 352, 356 are collected by focusing lens 348 onto detector 359.

FIG. 17 illustrates yet another alternate light scanning and collecting configuration, this one employing first and second holographic disks 360, 370. The two light generation and detection schemes are schematically designated as elements 362, 372 and may comprise any suitable single or dual light source and any suitable light detector configuration such as those already described in the above embodiments. The first and second holographic elements 360, 370 may be mounted separately and driven by separate motors, but preferably as illustrated may be mounted on a common axis or shaft 368 and rotatably driven by a single motor 366. The light beam from the first element 362 is directed through the first holographic disk 360 and reflected off the fold mirror 364 and scanned across the first mirror array. Similarly, the light beam from the second element 372 is directed through the second holographic disk 370 and reflected off the fold mirror 374 and scanned across the second mirror array. Return beams follow the same path and are detected in respective collection elements.

The above described scanning and collecting configurations are but a few examples of suitable configurations. Following the disclosure herein, one skilled in the art may combine portions of some of the configurations with other of the configurations.

Figure 18:
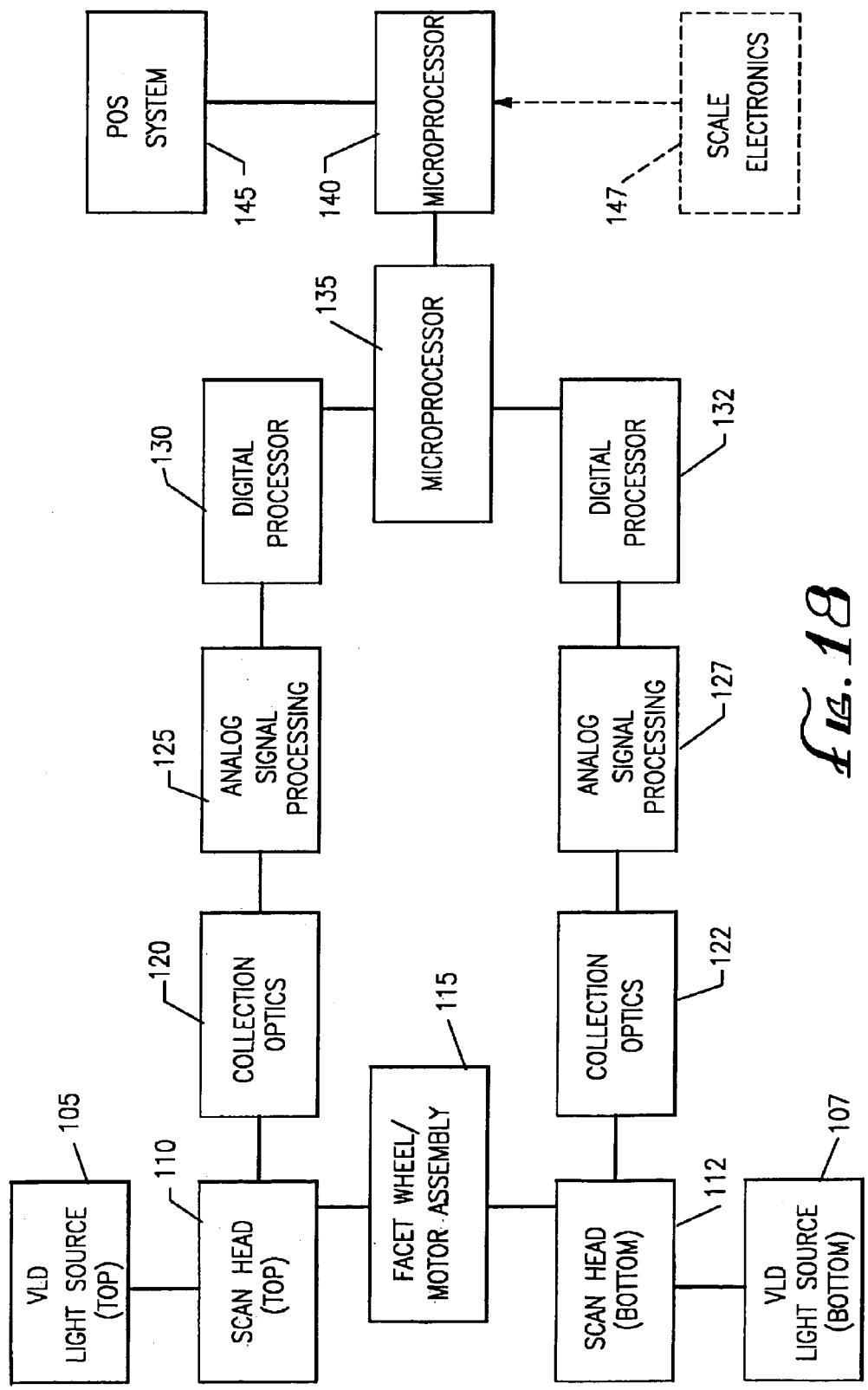
FIG. 18 is a flow chart of a preferred light scanning and collecting processing scheme.

FIG. 18 is a flow chart of a preferred light scanning and collecting processing scheme. A first (bottom) laser diode light source 107 and second (top) laser diode light source 105 generate light beams toward a respective bottom scan head 112 and top scan head 110. Scan beams from both the top scan head 110 and the bottom scan head 112 are reflected off a common facet wheel 115 or polygon mirror. Since the design may employ a common polygon mirror, the system requires only a single motor assembly resulting in reduced unit size, weight and cost as well as power consumption. Return signal is collected at top and bottom collection optics 120 and 122, with the signals processed in respective analog signal processing units 125, 127 and then converted and processed in respective digital processors 130, 132. The processed raw data from both digital processors 130, 132 is then input into a first microprocessor 135 where the signals are analyzed and processed together. This common processing allows for enhanced efficiency and scanning advantages. For example, a partial bar code scanned by a scan line generated from the top scan head 110 and collection optics 120 may be stitched together with a partial bar code scanned by a scan line generated from the bottom scan head 112 and collection optics 122 to achieve a complete scan. A second microprocessor 140, which may be separate from or included within the first microprocessor 135, may optionally integrate data input from the scale electronics 147 of a weigh scale. Once processed, data from the processor 140 is output to an application system illustrated as the point of sale system 145.

Figure 19:
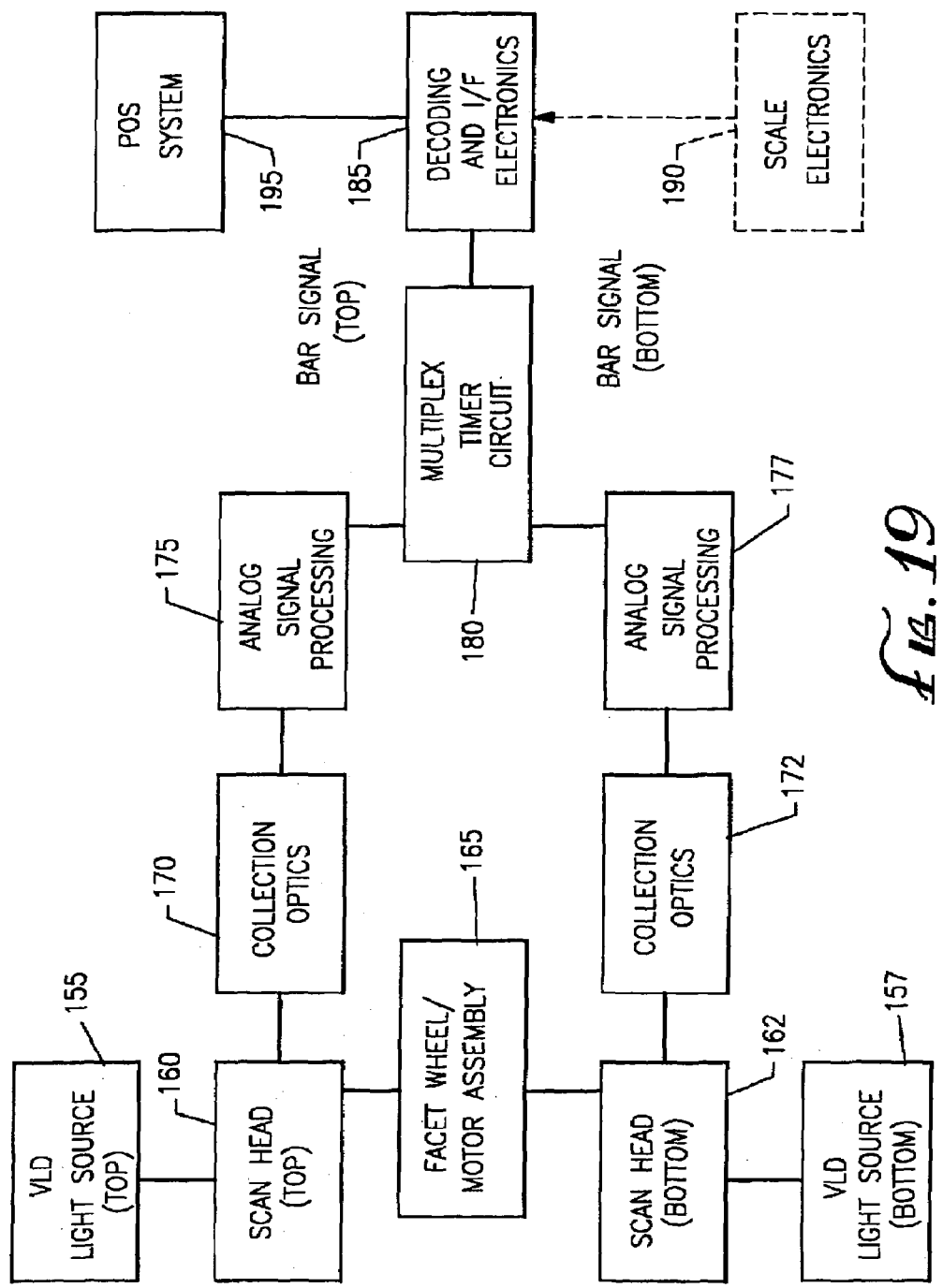
FIG. 19 is a flow chart of an alternate light scanning and collecting processing scheme.
Figure 21:
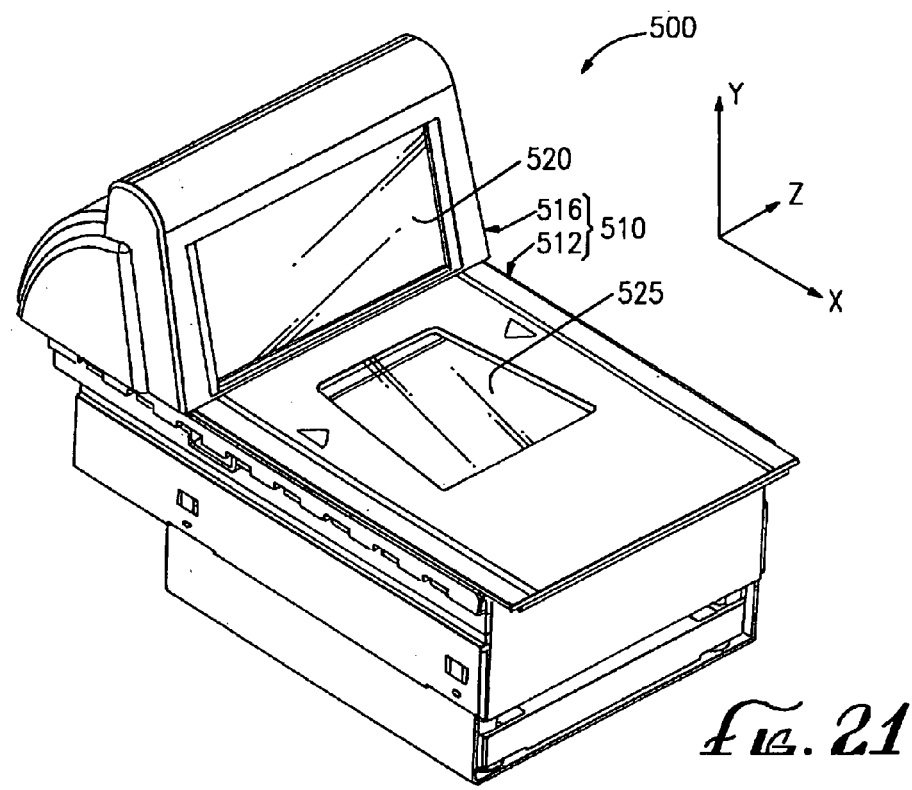
Figure 22:
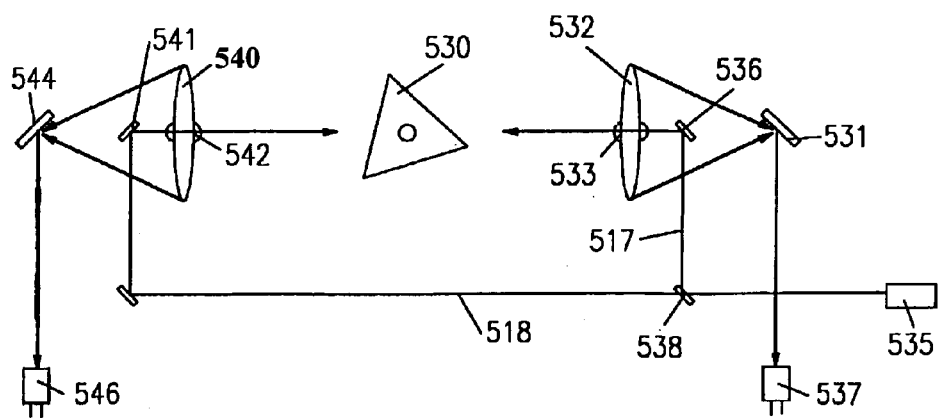
Figure 23:
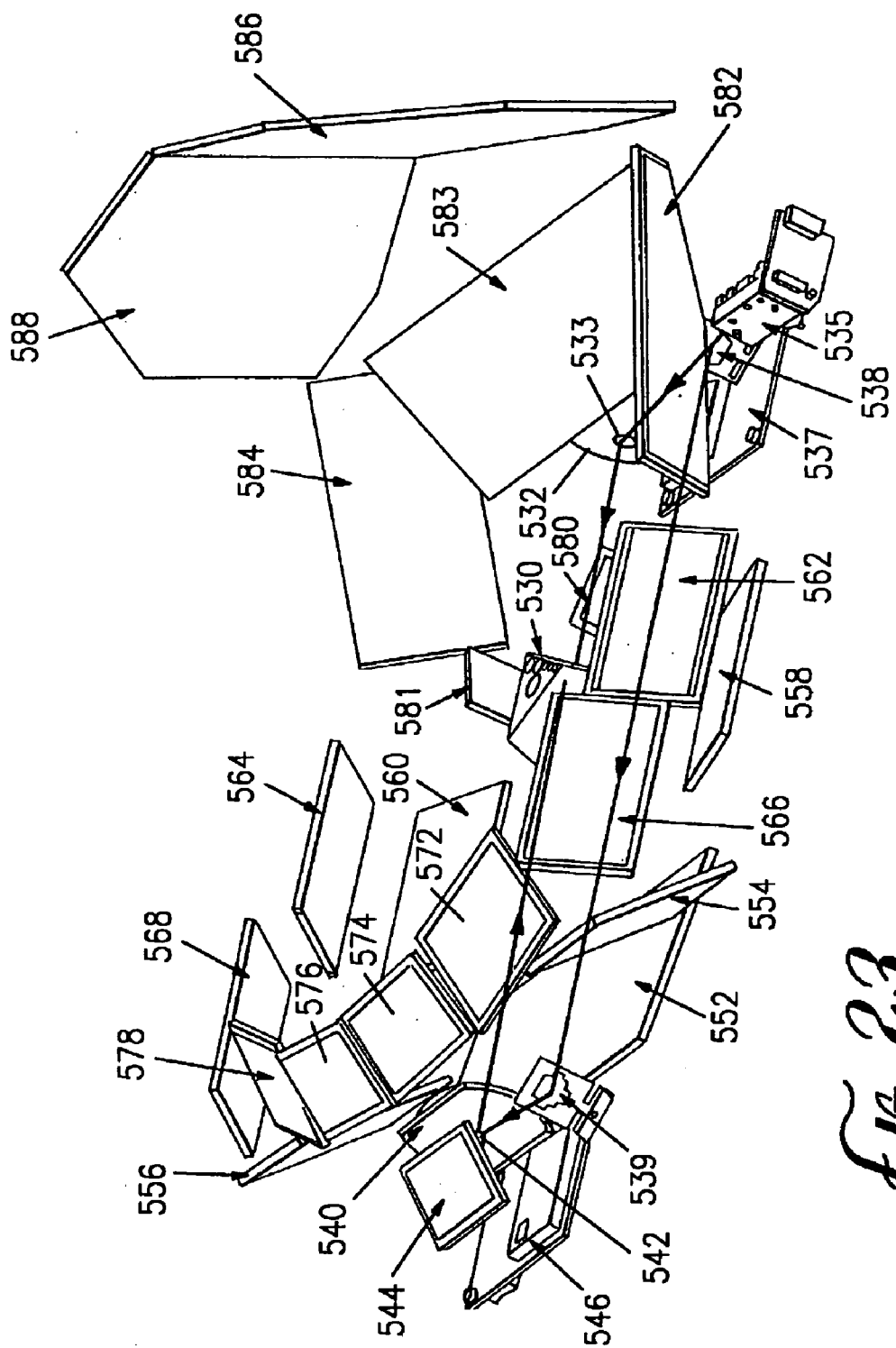
FIG. 23 is a diagrammatic side view of the internal optics of the scanner of FIG. 21.
Figure 24:
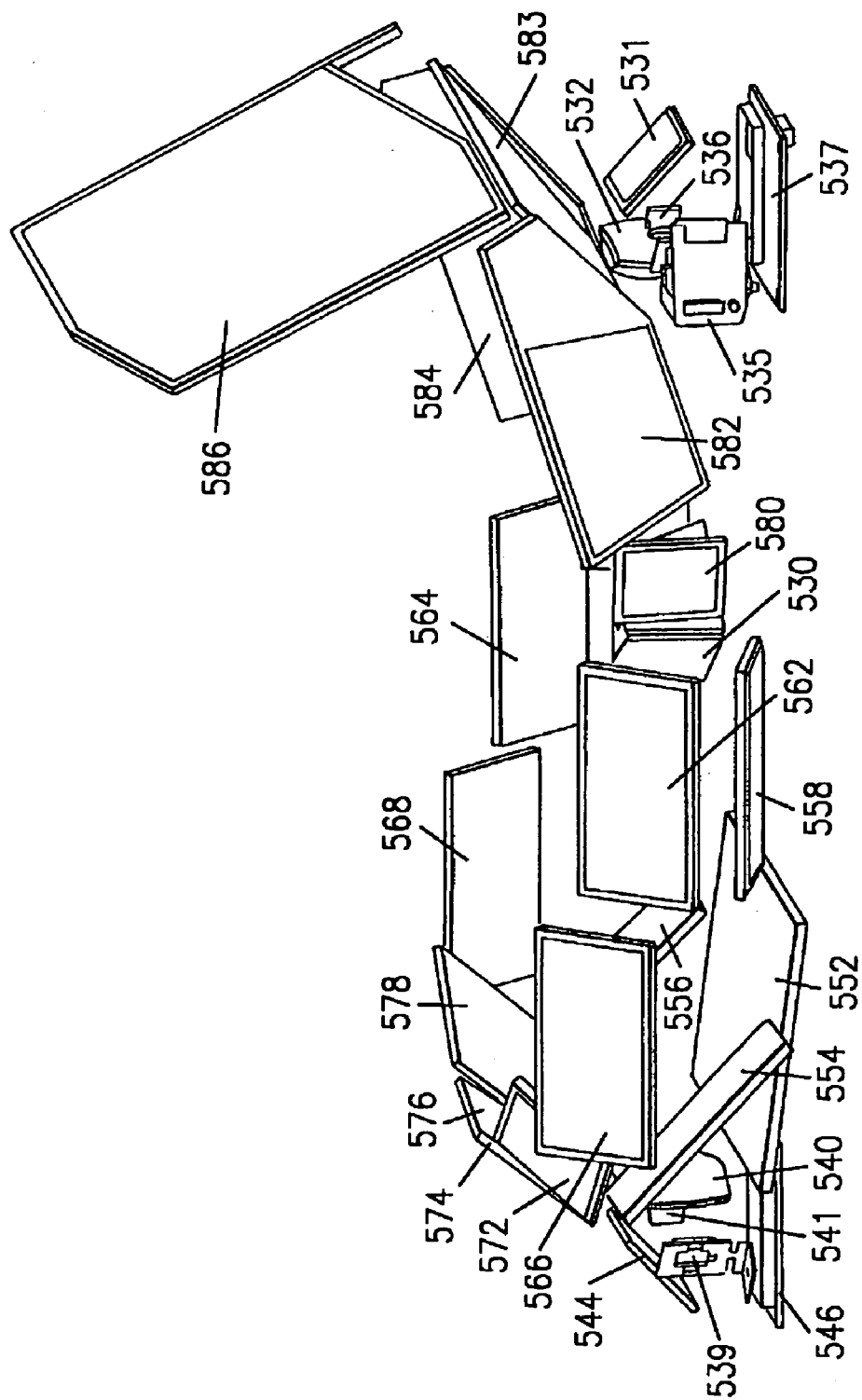
FIG. 24 is a side elevation view of the internal optics of the scanner of FIG. 21.
Figure 25:
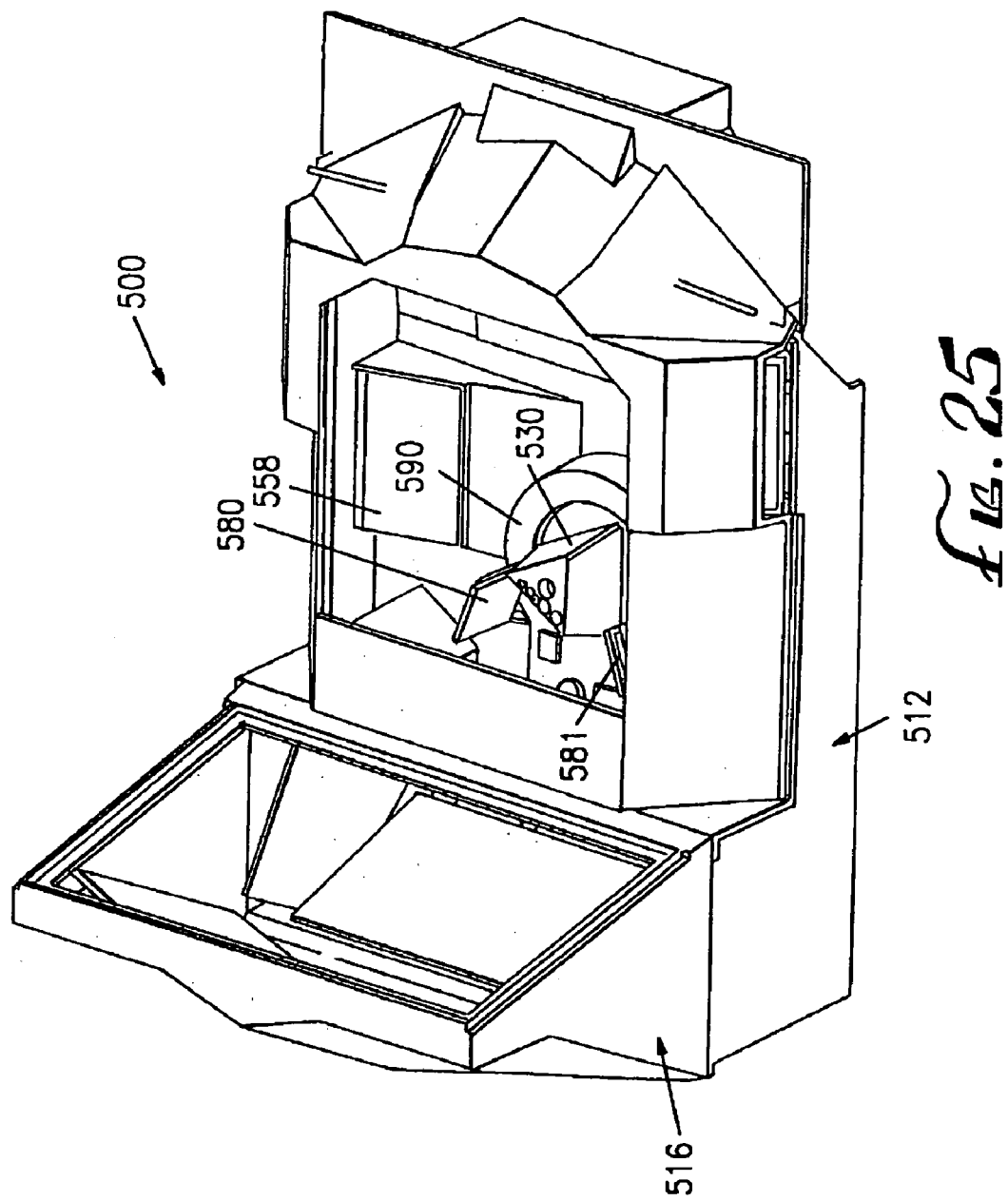
FIG. 25 is a top right side perspective view of the scanner of FIG. 21 in partial cutaway.

FIG. 19 is a flow chart of an alternate light scanning and collecting processing scheme. A first (bottom) laser diode light source 157 and second (top) laser diode light source 155 generate light beams toward a respective bottom scan head 162 and top scan head 160. Scan beams from both the top scan head 160 and the bottom scan head 162 are reflected off a common facet wheel 165. The return signal is collected at top and bottom collection optics 170 and 172, with the signals processed in respective analog signal processing units 175, 177 and then input into a multiplex timer circuit 180 so that the bar code signals from the top and bottom may be successively combined and transmitted to the decoding I/F electronics unit 185. This common processing allows for enhanced efficiency and scanning advantages similar to the previous embodiment. The decoding microprocessor 185 may optionally integrate data input from the scale electronics 190 of a weigh scale. Once processed, data from the processor 185 is output to the point of sale system 195.

The scanning system may also be combined with a horizontal scanner. FIG. 20 illustrates a combination vertical and horizontal scanner 410. The scanner 410 includes a housing 412 with a lower housing portion 414, an upper housing portion 416, and a lower horizontal housing portion 418. The scanner 410 generates a scan volume from four sets of scan lines projected from different generally orthogonal directions, a first set of scan lines emanating downwardly and sidewardly from a first mirror array 490 through the upper inclined window 425, a second set of scan lines emanating sidewardly from the second mirror array 480 through the vertical window 420, a third set of scan lines emanating generally upwardly and sidewardly from a third mirror array 470 through horizontal window 427 (away from the upper housing portion 414), and a fourth set of scan lines emanating generally upwardly and sidewardly from a fourth mirror array 460 through horizontal window 427 (toward the upper housing portion 414).

Alternately, the scanning systems of FIG. 1 or 20 may also be combined with a scale unit or a combined scale-scanner unit. In one alternate embodiment, element 427 may be a weigh scale unit providing weight data and as set forth in the flow chart of FIG. 18 for example, the input from the scale electronics 147 may be sent directly into the microprocessor 140. In yet another alternate embodiment, element 427 may be a combined weigh scale and scanner unit providing both a third scanning sweep and weighing capability. One such combined scale and scanner is disclosed in U.S. Pat. No. 4,971,176 which is hereby incorporated by reference.

An alternate multiplanar scanner is illustrated in FIGS. 21–39 showing a scanner 500 having a housing 510 with a lower horizontal housing portion 512 and an upper housing portion 516. The scanner 500 has two windows namely an upper window 520 arranged in a generally vertical plane and a lower window 525 arranged in a generally horizontal plane. The upper window 520 and the lower window 525 are arranged at a generally right angle to one another.

Figure 21:
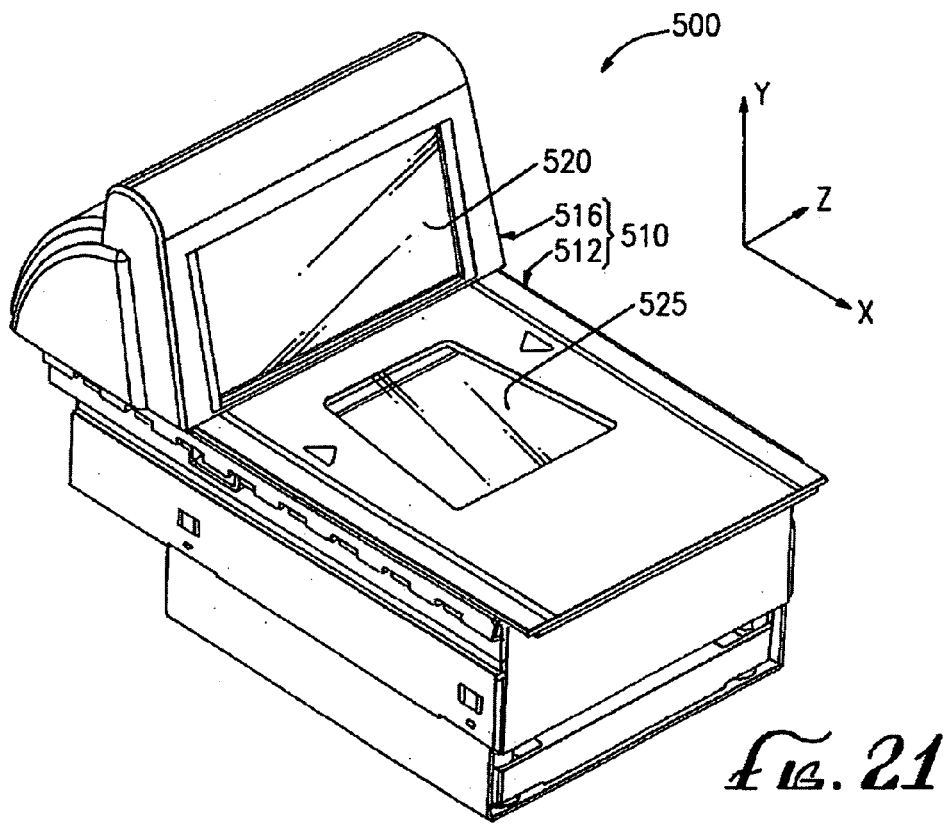
FIG. 21 is a top right side perspective view of an alternate multiplane scanner according to the present invention.
Figure 22:
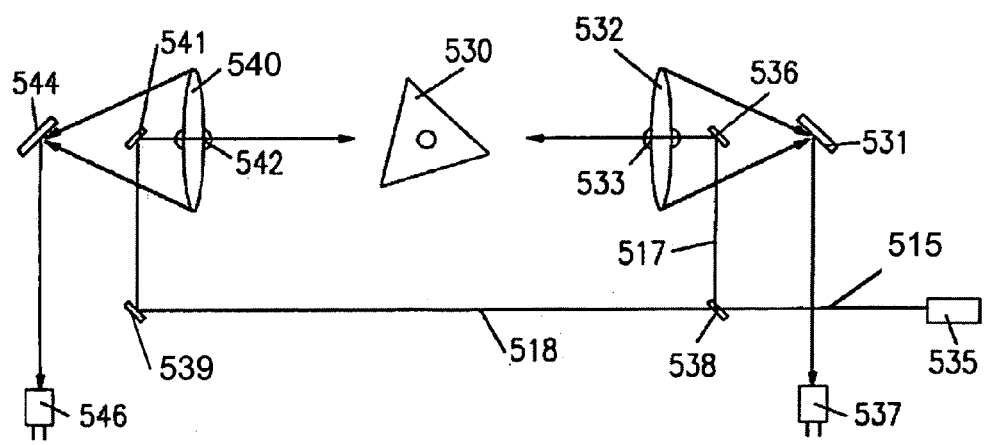
FIG. 22 is a simplified schematic of the optics of the scanner of FIG. 21.

FIGS. 22–25 illustrate a preferred optical configuration for the scanner of FIG. 21. A single light source shown as a visible laser diode 535 generates an optical beam 515 which is collimated and directed toward beam splitter 538 thereby creating a means for producing multiple beams. As shown in previous embodiments, the means for producing the first and second beams 517 and 518 may be comprised of separate light sources (see, e.g., FIG. 7 in which the separate light sources are comprised of first and second laser diodes 56, 76) or a single light source (see, e.g., the single laser diode 535 and the beam splitter 538 of FIG. 22). The beam splitter 538 splits the optical beam 515 into a first beam 517 and second beam 518. The first beam 517 is directed to a fold mirror 536 which reflects the beam 517 through a central lens focusing portion 533 in lens 532 and to rotating optical polygon 530. The second beam 518 is directed to a first fold mirror 539 and then off a second fold mirror 541 which reflects the beam 518 through a central lens focusing portion 542 in lens 540 and to rotating optical polygon 530. The optical polygon is rotated by a motor 590 with its speed controlled by a suitable controller. The optical polygon 530 includes three mirror facets for producing three different scan lines scanning the optical beam across the pattern mirrors. More facets may be employed and the facet wheel may scan the beam along the same path but different paths are preferred in this embodiment to achieve better coverage of scan lines. As the beam 517 is swept across the upper mirror array, a first set of scan lines is produced. The upper mirror array is comprised of mirrors 586, 588 located in the upper housing section 516 adjacent the vertical window 520. Routing mirrors 580, 581, 582, 583, and 584 route the scanning beam from the optical polygon 530 to the upper mirror array 586, 588. With the mirror facets on the spinning polygon mirror 530 positioned at different angles, each routing mirror(s)/array mirror combination will generate three scan lines per revolution of the polygon mirror 530.

Figure 26:
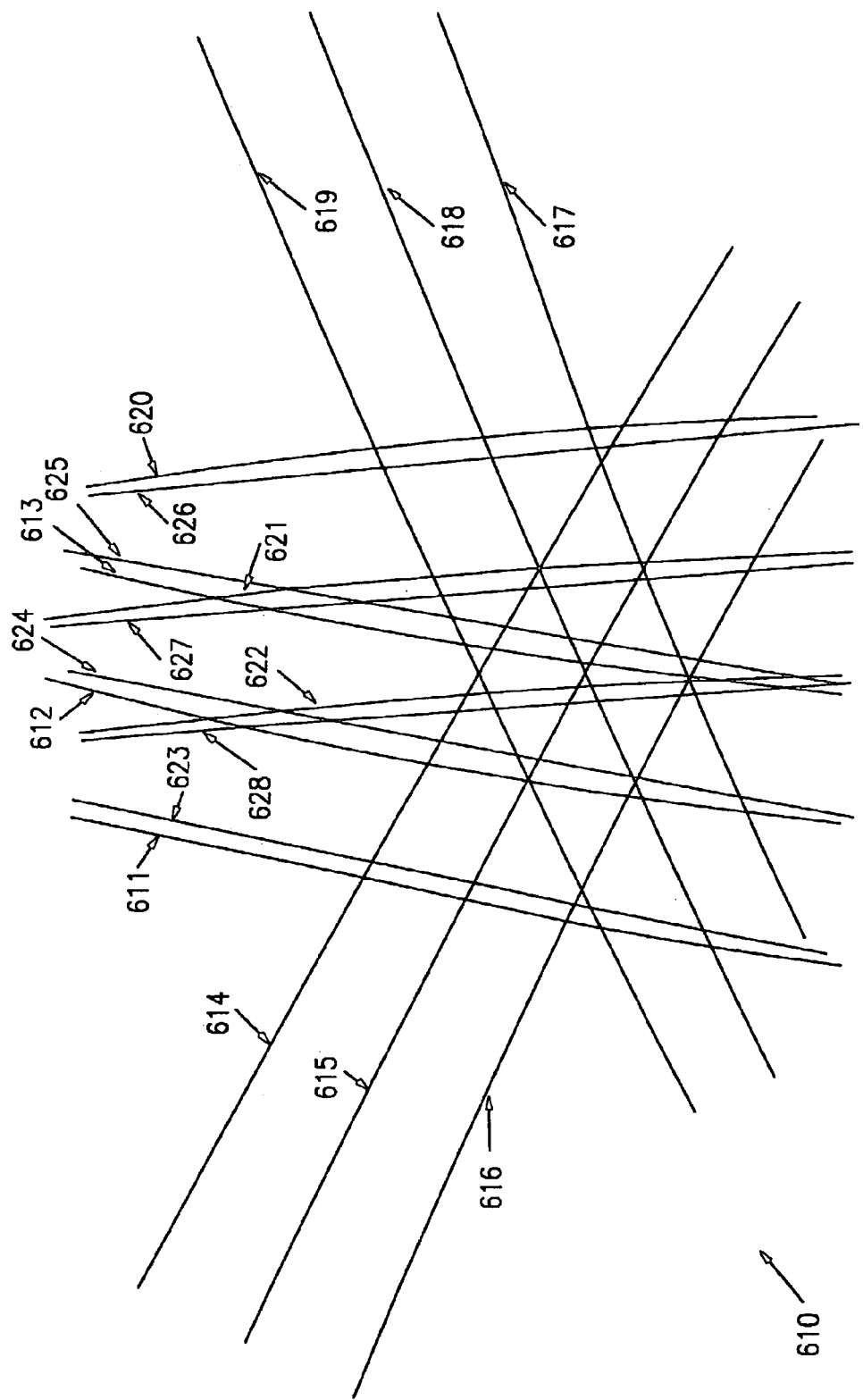
FIG. 26 is a diagrammatic view of the scan pattern along a vertical plane generated from the upper mirror array of the scanner of FIG. 21.

FIG. 26 is a diagrammatic side view of a scan pattern 610 of intersecting scan lines as shown in a vertical Y-Z plane in front of the vertical window 520. This first set of scan lines 610 emanates generally sidewardly through the vertical window 520. The pattern of the scan lines 610 is formed as shown in the following table:

| Routing mirror(s) | Array mirror | Scan lines |
| --- | --- | --- |
| 584 | 588 | 611, 612, 613 |
| 583 | 586 | 614, 615, 616 |
| 583 | 588 | 617, 618, 619 |
| 582 | 586 | 620, 621, 622 |
| 580, 584 | 588 | 623, 624, 625 |
| 581, 582 | 586 | 626, 627, 628 |

Figure 27:
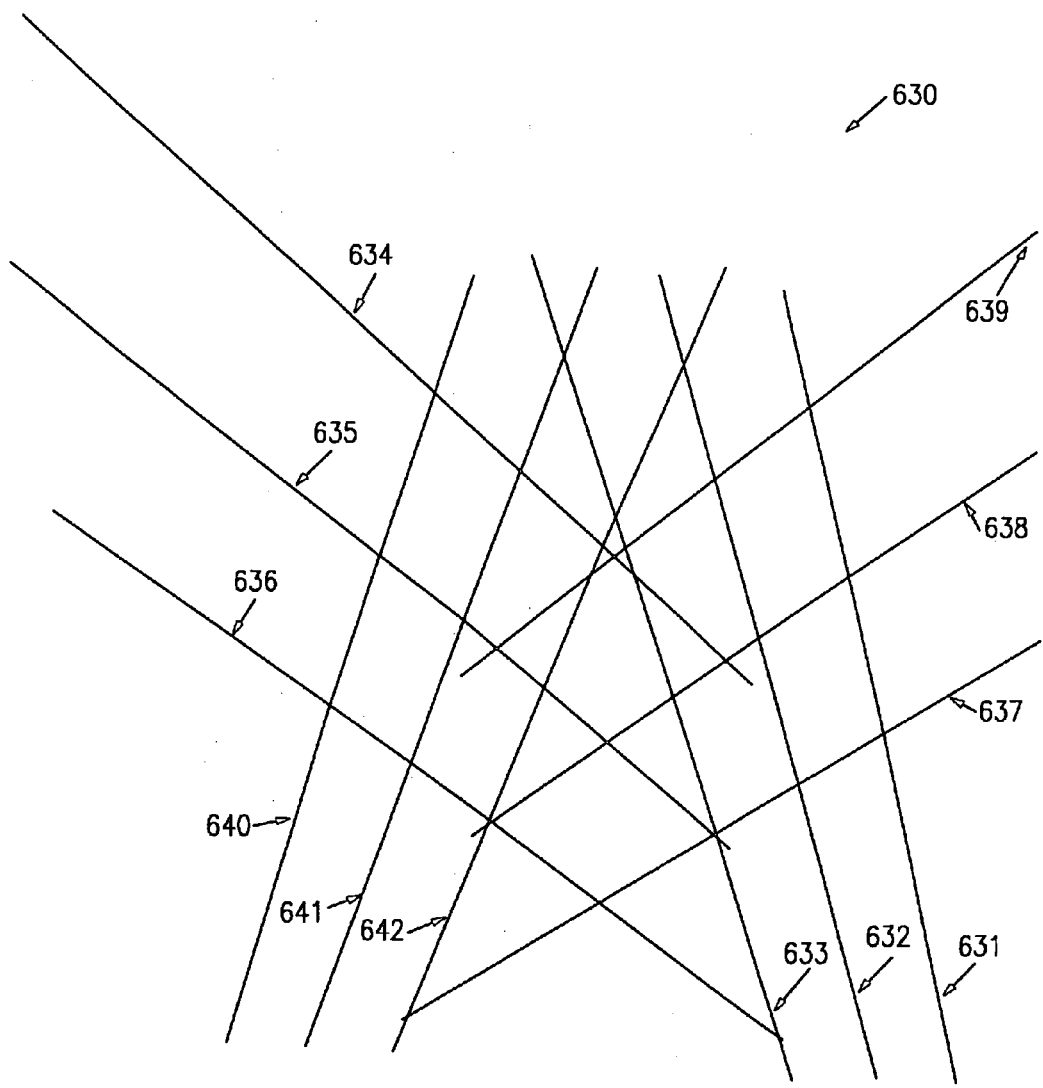
FIG. 27 is a diagrammatic view of the scan pattern along a vertical plane generated from the lower mirror array of the scanner of FIG. 21.

FIG. 27 is a diagrammatic side view of a scan pattern 630 of intersecting scan lines as shown in a vertical Y-Z plane in the scan volume facing away from the vertical window 520. This second set of scan lines 630 emanates generally sidewardly and upwardly through the horizontal window 525 toward the vertical window 520. The lines of the scan pattern 630 are formed as shown in the following table:

| Routing mirror | Array mirror | Scan lines |
|---|---|---|
| 566 | 554 | 631, 632, 633 |
| 572 | 552 | 634, 635, 636 |
| 578 | 552 | 637, 638, 639 |
| 568 | 556 | 640, 641, 642 |

Figure 28:
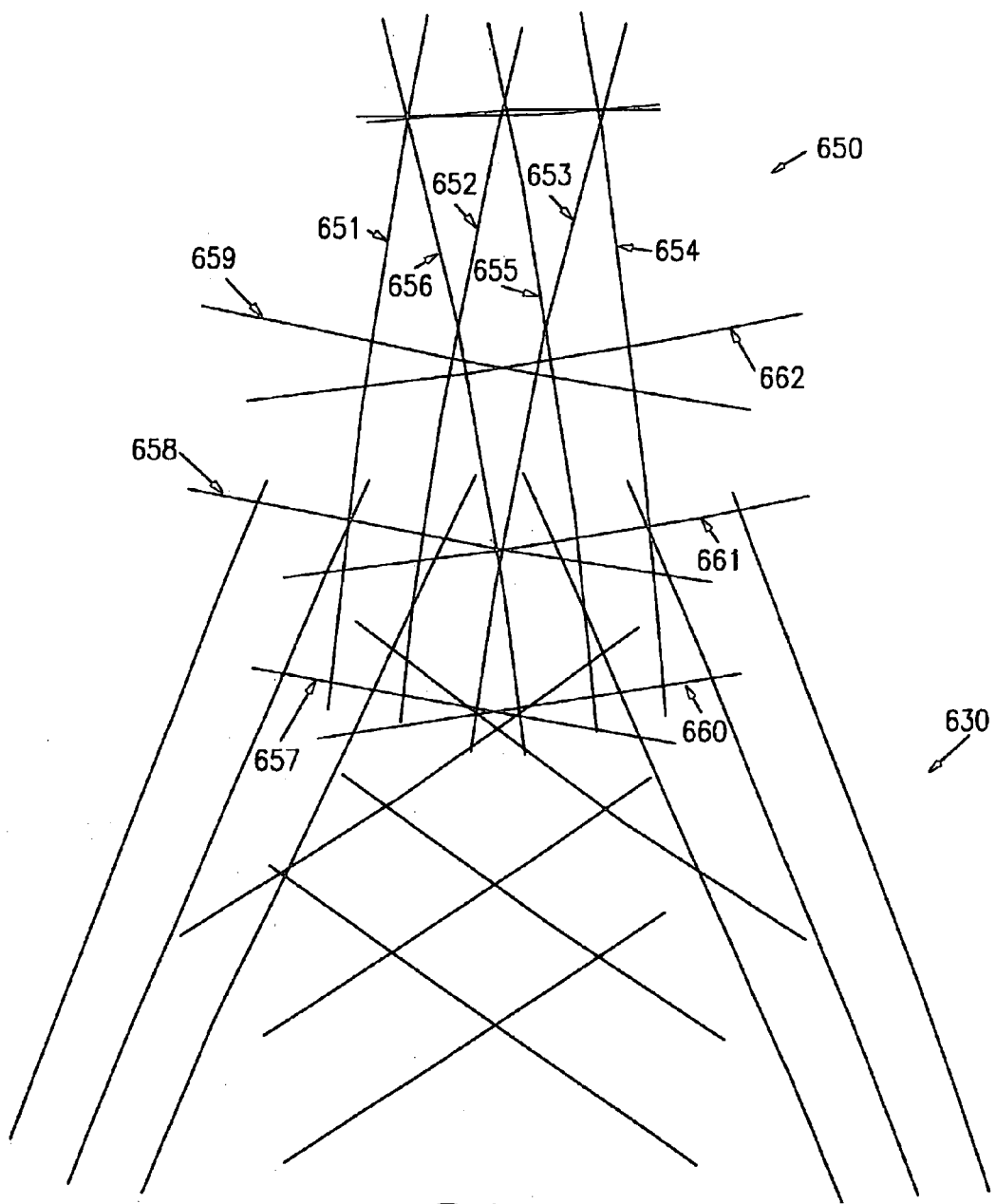
FIG. 28 is a diagrammatic view of the scan pattern along a horizontal plane generated from the lower mirror array of the scanner of FIG. 21.

FIG. 28 is a diagrammatic top view of a scan pattern 650 of intersecting scan lines as shown in a horizontal X-Z plane in the scan volume facing the horizontal window 525. This third set of scan lines 650 emanates generally upwardly and laterally sidewardly through the horizontal window 525 with scan lines 651–656 being perpendicular to the plane of the vertical window 520 and scan lines 657–662 being primarily for bottom scanning being toward the vertical window 520. The lines of the scan pattern 650 are formed as shown in the following table:

| Routing mirror | Array mirror | Scan lines |
|---|---|---|
| 564 | 560 | 651, 652, 653 |
| 562 | 558 | 654, 655, 656 |
| 576 | 552 | 657, 658, 659 |
| 574 | 552 | 660, 661, 662 |

FIG. 28 also shows the second set of scan lines 630 as they are visible and provide additional scanning coverage in the horizontal plane such as for scanning the bottom surface of an object being passed through the scan volume.

Moreover, each of the lateral sides of an object being passed through the scan volume may be scanned by lines from more than one of the sets of scan lines. Assuming an orientation of the scanner 500 with the product being moved through the scan volume along the "Z" direction (shown in the X, Y, Z directions in FIG. 21), the face of the object would be scanned primarily by lines 654–656 from the third set of scan lines 650 through the horizontal window 525 but also by lines 631–633 from the second set of scan lines 630 through the horizontal window 525 and by lines 620–622 and 626–628 from the first set of scan lines 610 through the vertical window 520. Thus a dense coverage of scan lines is achieved for all lateral sides of an object being passed through the scan volume.

Figure 29:
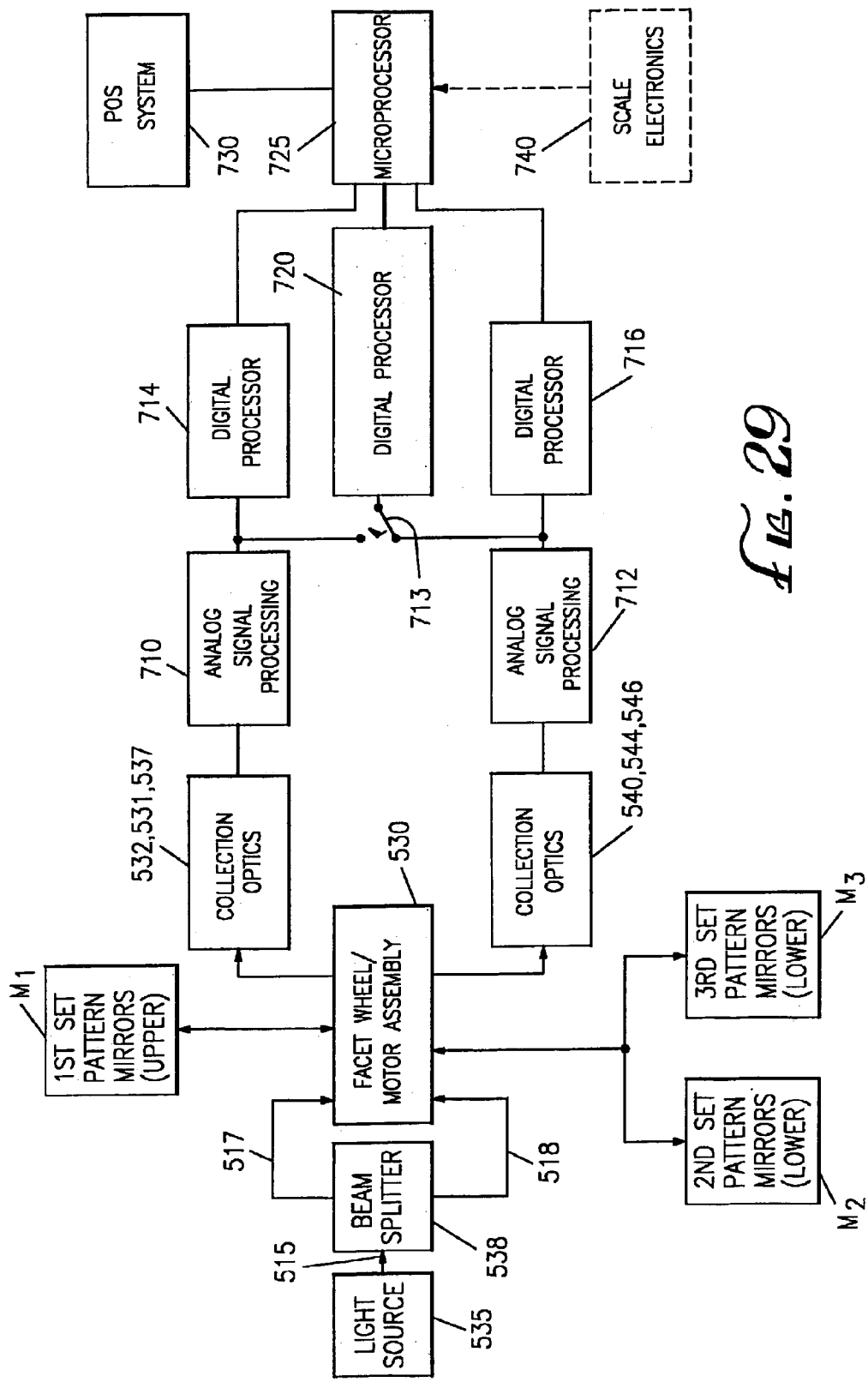
FIG. 29 is a flow chart of preferred light scanning and collecting processing schemes for the scanner of FIG. 21.

FIG. 29 is a flow chart illustrating the preferred scanning method. A light source 535 generates a beam of light 515 which is divided by a beam splitter 538 into a first beam 517 and a second beam 518. Preferably the beam splitter 538 transmits 40% of the beam to one side of the facet wheel 530 which scans the beam 517 across the first set of pattern mirrors $M_1$ for scanning through the vertical window 520 and 60% of the beam is reflected and directed to the opposite side of the facet wheel 530 and scanned across the second and third sets of pattern mirrors $M_2$ and $M_3$. The portion of the scanning beams returning via the first set of pattern mirrors $M_1$ reflect back off the facet wheel 530 and are collected by collection optics namely collection lens 532, collection folding mirror 531 and analog PCB with photodiode 537. The portion of the scanning beams returning via the second and third sets of pattern mirrors $M_2$ and $M_3$ reflect back off the facet wheel 530 and are collected by collection optics namely collection lens 540, collection folding mirror 544 and analog PCB with photodiode 546.

The separate collection optics permit the simultaneous scanning through the horizontal and vertical windows. Separate analog signal processors 710, 712 are provided for simultaneously processing the analog signals from the respective photodiodes. Each signal is then converted and processed in a respective digital processor 714, 716 and then input into the microprocessor 725 for final processing and transmittal to the point of sale system 730. Alternately, the signals from the analog signal processors 710, 712 may be routed to a single digital processor 720, multiplexed by a switching mechanism 713. Alternately, a combination of the above two embodiments may be used. Buffers (not shown) may be used in the above embodiments.

An integrated weigh scale may be incorporated into the horizontal housing portion 512. Such a system is preferably constructed with a concentric beam system which does not interfere with the placement of the horizontal window 525 at the center of a weighing platter. The signal from the scale electronics 740 may then be transmitted to the microprocessor 725 for processing and output to the POS system 730.

Thus, a scanning system and method for reading data have been shown and described. It is intended that any one of the disclosed outgoing light configurations may be combined with any one of the collecting configurations. Though certain examples and advantages have been disclosed, further advantages and modifications may become obvious to one skilled in the art from the disclosures herein. The invention therefore is not to be limited except in the spirit of the claims that follow.

The invention claimed is:

1. A method of scanning an item having a bar code from multiple directions to effectively scan the bar code when it appears on various sides thereof, comprising the steps of:
    generating laser light;
    providing a single multi-faceted mirrored polygon in a path of said laser light;
    generating a first group of scanning beams, a second group of scanning beams, a third group of scanning beams, and a fourth group of scanning beams, by reflecting said laser light off said mirrored polygon;
    directing said first group of scanning beams through a first transparent member oriented in a first plane to scan a surface of the item facing the first transparent member from one orthogonal direction to effectively scan a bar code located on a side of the item facing the first transparent member;
    directing said third group of scanning beams through the first transparent member oriented in the first plane to scan the item from a diagonal direction to effectively scan a bar code located on a leading or trailing side of the item;
    directing said fourth group of scanning beams through a second transparent member oriented in a second plane orthogonal to said first plane to effectively scan a bar code located on a side of the item facing the second transparent member from another orthogonal direction, the angle between the first and second planes being about ninety degrees;
    directing said second group of scanning beams through the first transparent member to scan a side of the item facing opposite the second transparent member from a diagonal direction to effectively scan a bar code located on the side of the item facing opposite the second transparent member.

2. The method of scanning an item in claim 1 wherein one of the first transparent member and the second transparent window is substantially vertical and the other is substantially horizontal.

3. The method of scanning an item in claim 1 wherein the first and second groups of scanning beams are each directed through the first transparent member to produce a plurality of intersecting scan lines; and the fourth groups of scanning beams is directed through the second transparent member to produce a plurality of intersecting scan lines.

4. The method of claim 1 wherein the third group of scanning beams is directed through the first transparent member to produce a plurality of intersecting scan lines.

5. The method of claim 1 wherein certain of the scan lines of the fourth group of scanning beams are directed diagonally through said second transparent member to scan the leading and trailing sides of the item.

6. The method of claim 1 comprising the further steps of:

arranging a first set of at least five mirrors and a second set of at least four mirrors so that the first, second and third groups of scanning beams are reflected from the first set of mirrors to the second set of mirrors and then out the first transparent member;

using one combination of mirrors from the first and second sets to direct the first group of scanning beams through the first transparent member;

using a second combination of mirrors from the first and second sets to direct the second group of scanning beams; and using a third combination of mirrors from the first and second sets to direct the third group of scanning beams through the first transparent member.

7. The method of claim 6 comprising:

using at least four mirrors of the first set in combination with at least three mirrors of the second set to direct the first group of scanning beams through the first transparent member.

8. The method of claim 6 comprising:

using at least four mirrors of the first set in combination with one or more mirrors in the second set to direct the second group of scanning beams through the first transparent member.

9. The method of claim 6 wherein the scanning beams of the first, second and third groups are each reflected from the first set of mirrors directly to the second set of mirrors, and then reflected from the second set of mirrors directly through the first transparent member.

* * * * *

UNITED STATES PATENT AND TRADEMARK OFFICE
CERTIFICATE OF CORRECTION

PATENT NO. : 7,198,195 B2 Page 1 of 1
APPLICATION NO. : 11/341071
DATED : April 3, 2007
INVENTOR(S) : Bobba et al.

It is certified that error appears in the above-identified patent and that said Letters Patent is hereby corrected as shown below:

<u>Column 2</u>
Line 64, change "an" to --a--.

<u>Column 13</u>
Line 9, change "groups" to --group--.

Signed and Sealed this

Seventh Day of April, 2009

JOHN DOLL
*Acting Director of the United States Patent and Trademark Office*